United States Patent
Götz et al.

(10) Patent No.: US 8,507,886 B2
(45) Date of Patent: Aug. 13, 2013

(54) OPTICAL SENSOR SYSTEM ON A DEVICE FOR THE TREATMENT OF LIQUIDS

(75) Inventors: Reinhold Götz, Hamburg (DE); Kurt Harnack, Tangstedt (DE); Helmut Knofe, Norderstedt (DE); Jens-Peters Kroog, Grosshansdorf (DE); Peter Scheffler, Hamburg (DE)

(73) Assignee: Eppendorf AG, Hamburg (DE)

( * ) Notice: Subject to any disclaimer, the term of this patent is extended or adjusted under 35 U.S.C. 154(b) by 460 days.

(21) Appl. No.: 12/676,637

(22) PCT Filed: Sep. 10, 2008

(86) PCT No.: PCT/EP2008/007404
§ 371 (c)(1),
(2), (4) Date: Oct. 12, 2010

(87) PCT Pub. No.: WO2009/033645
PCT Pub. Date: Mar. 19, 2009

(65) Prior Publication Data
US 2011/0031420 A1    Feb. 10, 2011

(30) Foreign Application Priority Data

Sep. 10, 2007 (DE) .......................... 10 2007 043 741

(51) Int. Cl.
*G01F 23/292* (2006.01)
(52) U.S. Cl.
USPC ........... 250/576; 250/573; 250/577; 356/436; 356/614; 356/622
(58) Field of Classification Search
USPC ............... 250/573, 576, 577, 559.21, 559.24, 250/559.29, 201.2; 356/601, 606–608, 614, 356/615, 622, 624, 436
See application file for complete search history.

(56) References Cited

U.S. PATENT DOCUMENTS

| 4,339,664 A | 7/1982 | Wikland et al. |
| 4,524,282 A | 6/1985 | King |
| 6,403,966 B1 * | 6/2002 | Oka .............................. 250/372 |

(Continued)

FOREIGN PATENT DOCUMENTS

| DE | 19924259 C2 | 12/2000 |
| DE | 10350918 B3 | 4/2005 |

(Continued)

*Primary Examiner* — Kevin Pyo
(74) *Attorney, Agent, or Firm* — Vidas, Arrett & Steinkraus, P.A.

(57) ABSTRACT

Optical sensor system on a device for the treatment of liquids with at least one device for the projecting of light in the direction of an optical axis onto at least one illumination area in the space, an adjustment device for the adjustment of the relative position of the at least one illumination area and a boundary surface in a direction diagonal to the optical axis, an adjustment device for the adjustment of the relative position of the at least one illumination area and the boundary surface in the direction of the optical axis, a control device for controlling the adjustment devices, such that they simultaneously adjust the relative position of the at least one illumination area and the boundary surface diagonal to the at least one device for the imaging of the at least one illumination area during the adjustment of the relative position onto at least one photodetector and an evaluation device connected with the at least one photodetector for the evaluation of the at least one measurement signal.

66 Claims, 17 Drawing Sheets

(56) References Cited

U.S. PATENT DOCUMENTS

Figure 2:
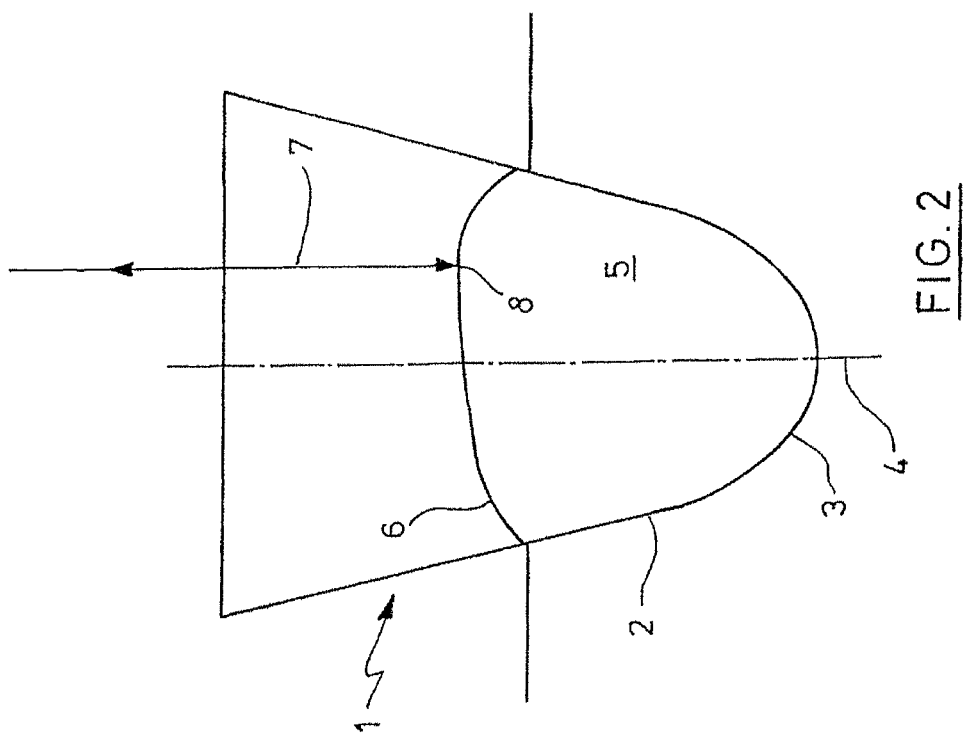

| | | |
|---|---|---|
| 2002/0015149 A1 | 2/2002 | Rahbar-Dehghan |
| 2003/0038950 A1 | 2/2003 | Spolaczyk |
| 2003/0103662 A1 | 6/2003 | Finkbeiner |
| 2004/0260520 A1 | 12/2004 | Braendle et al. |
| 2005/0156607 A1 | 7/2005 | Okamura |
| 2005/0285060 A1 | 12/2005 | Haga et al. |

FOREIGN PATENT DOCUMENTS

| | | |
|---|---|---|
| EP | 1 288 635 A2 | 3/2002 |
| JP | 1 110222 | 4/1989 |
| WO | 92/08104 | 5/1992 |
| WO | 03023370 A2 | 3/2003 |

\* cited by examiner

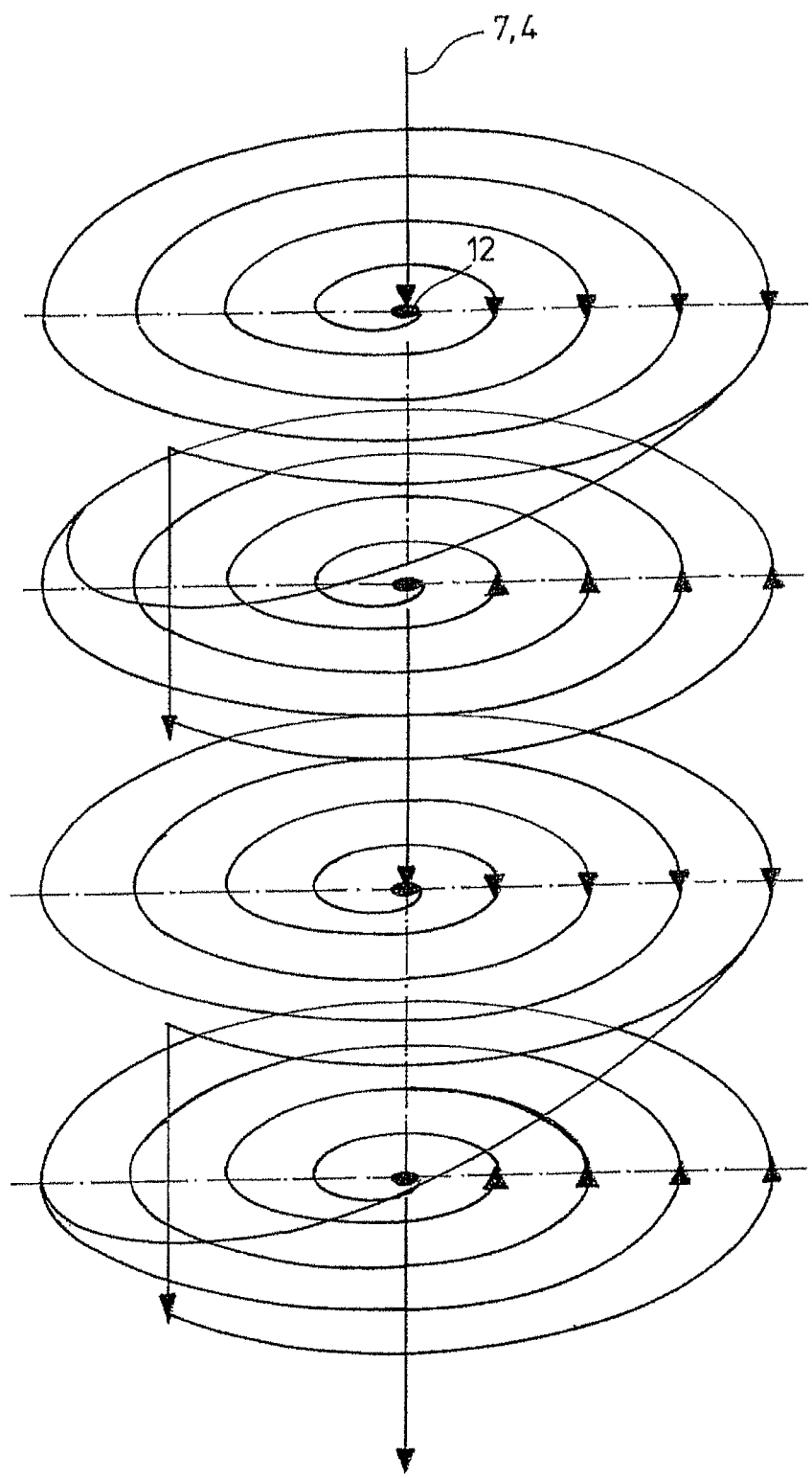

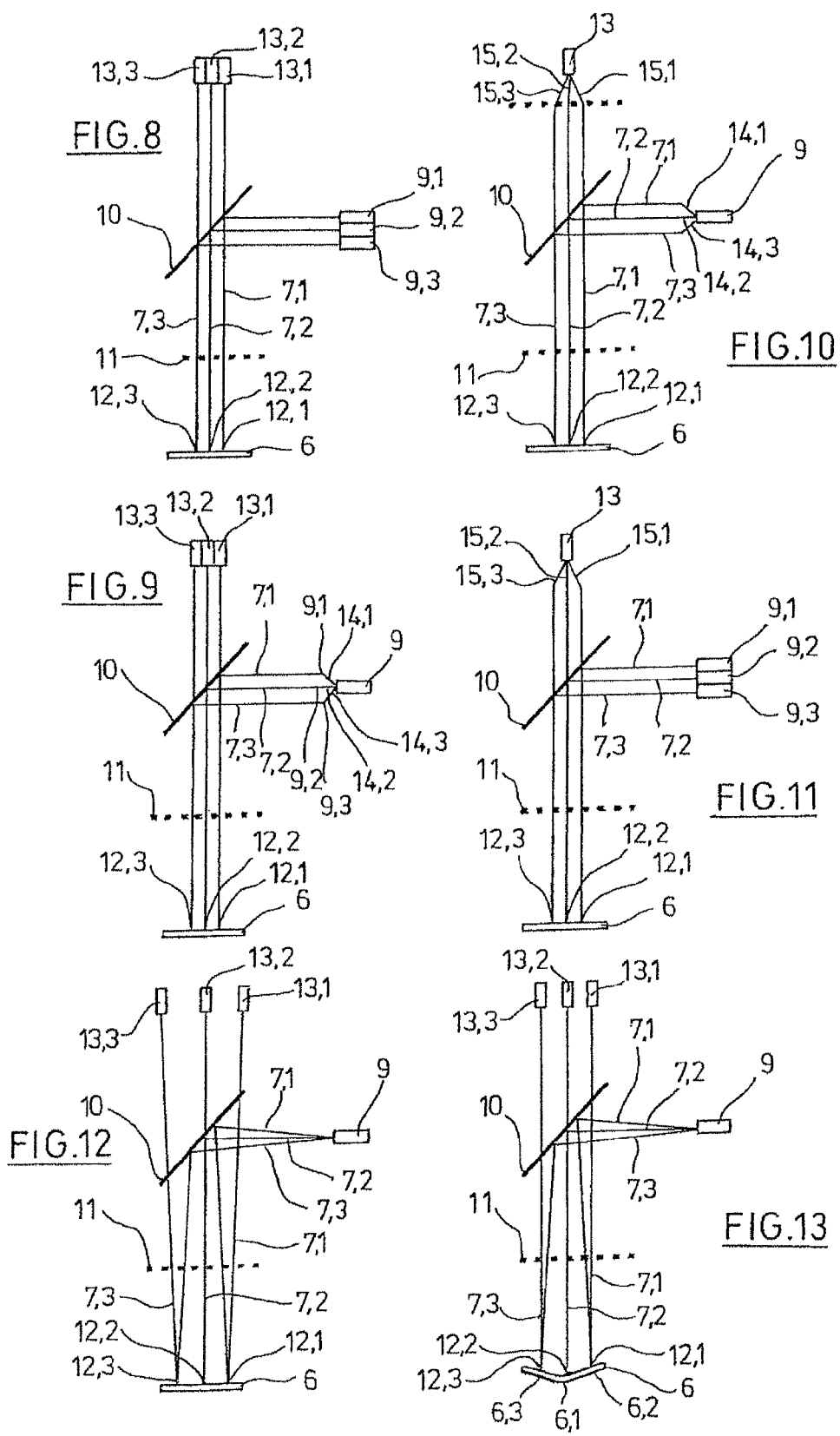

OPTICAL SENSOR SYSTEM ON A DEVICE FOR THE TREATMENT OF LIQUIDS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to an optical sensor system on a device for the treatment of liquids.

An optical sensor system of the type according to the invention serves e.g. to determine the height of the liquid level in receptacles (e.g. reaction receptacles or wells of microplates), the position and identity of receptacles (e.g. reaction receptacles or microplates) and the position and the identity of objects (e.g. tools, accessories, pipette tips in a rack and other lab products) in a device for the treatment of liquids.

A device for the treatment of liquids can be in particular a device for the dosing and/or transporting and/or examination and/or processing (e.g. chemical, physical or biological) of liquids. In the case of known devices for the treatment of liquids, the activities are performed either manually or partially or fully automatically. Thus, for example, manual pipettes, PC-supported dosing systems and fully automated dosing stations are known for dosing. There are fully automated treatment stations (workstations) for the dosing, transporting, examining and processing of liquids.

Both in the case of manual and automated pipetting, the pipette tip must be immersed into the liquid with the smallest possible immersion depth when receiving liquids, because the dosing error increases with the immersion depth and the pipette tip or the receptacle can be damaged when immersed too far. Furthermore, the pipette tip must be immersed throughout the duration of the liquid intake so that air is not sucked in. It should be taken into consideration thereby that the liquid level in the receptacle decreases during the liquid intake. During manual pipetting, the user must constantly check the immersion depth of the pipette tip and track the pipette tip. In the case of automated dosing devices, monitoring and control devices are used.

A device for the treatment of liquids with an illumination device for illuminating an approximately punctiform illumination area in the space and an approximately punctiform light receiving device with a photodetector for delivering a measurement signal dependent on the intensity of the received light is known from EP 1 288 635 A2. The device has an imaging system for the imaging of the illumination area onto the approximately punctiform light receiving device. It also has an evaluation device for capturing the approximation of a boundary surface between two media with different refraction indices onto the illumination area through evaluation of the measurement signals delivered by the photodetector. When a boundary surface between two media with different refraction indices enters the illumination area, the intensity of the light radiation received by the light receiving device and thus the measurement signal delivered by the photodetector changes greatly. Thus, it can be determined whether or not a boundary surface is located in the illumination area.

Since the light beam of the illumination device and the imaging system can be oriented coaxially towards the illumination area, a contactless detection of boundary layers is possible from a greater distance and under low lateral required space. This promotes the detection of the liquid level in receptacles with a comparatively small opening and/or comparatively great depth.

Light of one wavelength, for which a liquid (e.g. water) is opaque, can specifically be used to detect a liquid level free of disturbances from close receptacles.

For the determination of the position of a boundary surface, the relative position of the illumination area and boundary surface can be changed until the boundary surface is located in the illumination area. Furthermore, it is possible to scan the surface of an object with the illumination area, in order to determine the position of the entire object and/or its identity based on individual values or the progression of the measurement signal. For this, the apparatus can have an adjustment device for adjusting the relative position of the illumination area and the boundary surface in the direction of the optical axis of the imaging system and/or diagonally to it. The relative position of the optics and the boundary surface established by the illumination device, the imaging system and the light receiving device can be adjusted by means of the adjustment device. But it is also possible that the adjustment device has a zoom lens in the imaging system. The evaluation device can control the adjustment of the relative position of the illumination area and boundary surface through the adjustment device. The adjustment can then take place depending on the measurement signals, for example in order to set the illumination area to the boundary surface and/or to move along the boundary surface.

For the positioning of the illumination point on the boundary surface or respectively the location of the boundary surface, the adjustment device must cover many long traverse paths. This takes a lot of time and decreases the operating speed of the device for treating liquid.

Based on this, the object of the invention is to provide an optical sensor system on a device for the treatment of liquids and a method for the operation of such an optical sensor system, which enables faster detection of boundary surfaces.

BRIEF SUMMARY OF THE INVENTION

The optical sensor system according to the invention on a device for the treatment of liquids has at least one device for projecting light in the direction of an optical axis onto at least one illumination area in the space, an adjustment device for adjusting the relative position of the at least one illumination area and a boundary surface in a direction diagonal to the optical axis, an adjustment device for adjusting the relative position of the at least one illumination area and a boundary surface in the direction of the optical axis, a control device for controlling the adjustment devices so that they simultaneously adjust the relative position of the at least one illumination area and the boundary surface in a direction diagonal to the optical axis and in the direction of the optical axis, at least one apparatus for the imaging of the at least one illumination area during the adjustment of the relative position of at least one photodetector and an evaluation device connected with the at least one photodetector for evaluating the at least one measurement signal.

The invention is based in particular on the following knowledge: the optical sensor system of the device for the treatment of liquids as per EP 1 288 635 A2 is reliant on the fact that the illumination device, the light receiving device and the boundary surface are aligned with each other such that light from the illumination area is reflected on the boundary surface exactly on the punctiform light receiving device. In the case of coaxial alignment of the illumination device and the imaging system towards the illumination area, the illumination device and the imaging system must be arranged perpendicularly towards the boundary surface so that the light is reflected from the punctiform illumination area onto the punctiform light receiving device. As of a certain angle of incline of the boundary surface to the axis of the illumination device, the reflected light no longer hits the light receiving device. Thus, this inclined boundary surface is not detected by the optical sensor system.

In receptacles, the surfaces of liquids develop differently, in particular in receptacles with small dimensions like reaction receptacles and wells in microtiter plates. The shapes of these boundary surfaces are determined in particular through gravitation, dimensions of the receptacles, fill type of the liquid, surface tension of the liquid, moistening properties of the walls of the receptacles and other multilayer influences, which do not permit a prediction of the optimal reflection point, in which the illumination device and the imaging system are arranged perpendicular towards the boundary surface.

The optimal reflection point can have a large area, in particular in the case of even liquid surfaces in relatively large receptacles, and a small area in particular in the case of relatively uneven liquid surfaces in small receptacles. Specifically in the case of hand-pipetted liquid samples, the liquid surface can be uneven, since the liquid is preferably released at the wall of the receptacle. The optimal reflection point can thus lie far outside of the center.

The known optical sensor system must if applicable be moved multiple times horizontally and vertically until the optimal reflection point is located. Accordingly, the detection of the boundary surface can require long traverse paths and takes a correspondingly long period of time.

The optical sensor system according to the invention projects light onto at least one illumination area, the position of which can be changed with respect to the boundary surface in a direction diagonal to the optical axis and in the direction of the optical axis of the optical sensor system. The illumination area or the boundary surface or the illumination area and the boundary surface can hereby be moved in a direction diagonal to the optical axis and in the direction of the optical axis. Insofar as the displacement of the illumination area diagonal to the optical axis and in the direction of the optical axis is referred to below for the purposes of simplification, these specifications also apply analogously to the other named displacement possibilities. The position of the illumination area with respect to the boundary surface can be changed in a direction diagonal to the optical axis of the optical sensor system by means of the adjustment device for adjusting the relative position of the at least one illumination area and a boundary surface in a direction diagonal to the optical axis. The position of the illumination area with respect to the boundary surface can be changed in the direction of the optical axis of the optical sensor system by means of the adjustment device for adjusting the relative position of the at least one illumination area and the boundary surface in the direction of the optical axis. The boundary surface can be in particular a surface between air and a liquid in a receptacle or on a support, a surface between a liquid and a receptacle or a support (e.g. the bottom of a receptacle) or a surface between air and a lab object (e.g. the surface of a microtiter plate or one or more reaction receptacles or of a tool). For adjusting the relative position of the illumination area with respect to the boundary surface, the adjustment device can fully or partially displace the device for projecting light and/or displace the boundary surface or a part of the optical sensor system supporting the boundary surface.

The displacement of the illumination area in a direction diagonal to the optical axis can take place very quickly. The area of the displacement of the illumination area diagonal to the optical axis can correspond with the cross-sectional area of lab receptacles in the fill area. The movement of the illumination area diagonal to the optical axis superimposed on the movement in the direction of the optical axis coats—in comparison with the conventional optical sensor system—a larger surface in a short period of time so that the optimal reflex point of spatially curved surfaces of liquids in receptacles (so-called menisci) can be found faster. Through the displacement of the illumination area diagonal to the optical axis simultaneously with the displacement of the illumination area in the direction of the optical axis, the measurement process can be considerably accelerated since the optical sensor system finds the optimal reflection points faster. As a result, the position of the surfaces in the space can be determined with less displacement of the illumination area in the direction of the optical axis. This saves time during the detection procedures.

The quasi simultaneous adjustment, during which a displacement in the direction diagonal to the optical axis and a displacement in the direction of the optical axis takes place alternately or respectively chronologically overlapping each other, is included in the simultaneous adjustment of the relative position of the at least one illumination area and the boundary surface in a direction diagonal to the optical axis and in the direction of the optical axis. The alternating or respectively chronologically overlapping adjustment of the relative position in the different directions is performed in quick succession.

In another difference compared to the known device for the treatment of liquids with an optical sensor system, the illumination area is not adjusted alternately over the entire adjustment range in the direction of the optical axis and then laterally displaced until a reflection point is found, but is rather displaced quickly laterally along the optical axis during progression so that the optical reflection point is located faster. In the case of the optical sensor system in accordance with the invention, the light beam is displaced dynamically with respect to the optical axis as needed or is deflected out of it. In the case of the known sensor system, the light is emitted statically along the optical axis of the projecting device.

The control device and the evaluation device can be different devices. They can also be formed by a common device, which performs the control and evaluation functions. The control device and the evaluation device are preferably one or more electronic devices.

Through the evaluation of the at least one measurement signal, the evaluation device determines whether the boundary surface is located in the least one illumination area. If the boundary surface is located in the at least one illumination area, the control device for adjusting the relative position of the at least one illumination area and of the boundary surface can stop by means of the adjustment devices or respectively set a defined relative position of the at least one illumination area and of the boundary surface.

The optical axis corresponds with a basic arrangement of the projection axis of the projecting device. The optical axis can be taken by the projection axis at the beginning of a scanning operation and/or can be taken once or repeatedly during the course of a scanning operation.

The change in the relative position of the illumination area and the boundary surface in a direction diagonal to the optical axis can take place in different manners. In accordance with one embodiment, the adjustment device for adjusting the relative position of the least one illumination area and the boundary surface in a direction diagonal to the optical axis is a device for pivoting a projection axis of the projecting device with respect to the optical axis and/or a device for the parallel displacement of the projection axis of the projecting device with respect to the optical axis. According to this, the projection axis is deflected and/or displaced parallel.

In accordance with another embodiment, the device for pivoting the projection axis of the light has a mirror that can be pivoted on two axes and/or other beam deflection means in the beam path of the at least one projecting device.

In accordance with another embodiment, the device for the parallel displacement of the projection axis of the light has planar glass that can be pivoted around two axes in the beam path of the at least one projecting device and/or a device for displacing the at least one projecting device along two different axes diagonal to the optical axis. In particular, the device for parallel displacement can be a device, which displaces the projecting device diagonal to the optical axis, but does not displace the adjustment device for adjusting the relative position of the at least one illumination area and the boundary surface in the direction of the optical axis.

In accordance with another embodiment, the adjustment devices for adjusting in a direction towards the optical axis and in the direction of the optical axis are formed by a common device, e.g. by a X-, Y-, Z-transport device, i.e. by an adjustment device, which can displace the optical sensor along three spatial axes.

In accordance with one embodiment, the control device is a control device for controlling the displacement of the at least one illumination area in a direction diagonal to the optical axis within a restricted area around the optical axis. The displacement of the at least one illumination area can be restricted to a comparatively small area. The area can advantageously be adjusted to the size of the cross-section of the receptacles in the areas, into which the liquid level to be scanned rises. For example, there are standardized microplates with 96, 384 or 1536 wells. The wells have standardized cross-sections. The area of the displacement in a direction diagonal to the optical axis can be selected such that it covers one, several or all standardized cross-sections of microplates or can be adjusted accordingly. The same goes for lab receptacles (e.g. Eppendorf tubes), which are available in quasi standardized sizes. In accordance with one embodiment, the optical sensor system automatically adjusts the area of the displacement diagonal to the optical axis to the size of a cross-section of a receptacle identified and/or determined through scanning. Furthermore, the displacement can be provided in a direction diagonal to the optical axis within a restricted area around the optical axis through the construction of the adjustment device for adjusting the relative position of the at least one illumination area and of the boundary surface diagonal to the optical axis.

In accordance with a preferred embodiment, the control device is a control device for controlling the displacement of the at least one illumination area diagonal to the optical axis so that the optical axis is arranged approximately in the center of the displacement.

The displacement of the at least one illumination area in a direction diagonal to the optical axis can take place along different paths. In accordance with another embodiment, the control device is a control device for controlling the displacement of at least one illumination area in a direction diagonal to the optical axis along a spiral and/or cycloid and/or circular and/or zigzag and/or other specified path and/or an accidental and/or chaotic path and/or a continuous and/or a broken path.

In accordance with another embodiment, the control device is a control device for controlling the displacement of the at least one illumination area from the optical axis up to the reaching of a maximum distance from the optical axis and/or the displacement of the at least one illumination area from a maximum distance from the optical axis to the optical axis. The movement progression can take place in the opposite direction. This can be combined in particular with the movement along a spiral path. After spiral displacement up to the maximum distance, the return to the optical axis can take place abruptly. Furthermore, the movement up to the maximum distance and the movement to the optical axis can be absolved back along a spiral path.

In accordance with another embodiment, the control device is a control device for controlling the displacement of the at least one illumination area repeatedly from the optical axis up until the reaching of a maximum distance from the optical axis and from the maximum distance to the optical axis.

In accordance with one embodiment, the optical axis is arranged vertically.

The evaluation device can determine the optical reflection point in different manners. In accordance with one embodiment, it is an evaluation device for determining the maximum measurement signal during the displacement of the at least one illumination area diagonal to the optical axis and/or in the direction of the optical axis.

In the case of the maximum measurement signal determined in this manner, the illumination area is not necessarily positioned at the optimal reflection point. In accordance with one embodiment, in order to improve the positioning, after determining the maximum measurement signal, the control device controls the displacement of the at least one illumination area approx. to the position or to a certain distance from the position in the direction of the optical axis, in which the maximum measurement signal was determined, and again controls the displacement of the at least one illumination area diagonal to the optical axis and in the direction of the optical axis, wherein the new displacement takes places around a shorter path and/or at a lower speed than the previous displacement. The illumination area is hereby positioned closer to the optimal reflection point. The operation can be repeated multiple times.

In accordance with one embodiment, the projecting device is a device for the simultaneous projecting of light onto several illumination areas and/or the projecting device is a device for the simultaneous projecting of light under different angles onto the same illumination area and/or the optical sensor system has several photodetectors.

According to this embodiment, the optical sensor system simultaneously illuminates several illumination points and/or simultaneously illuminates the same illumination area under different angles and/or has several photodetectors, which can simultaneously receive light and deliver a measurement signal depending on the received light. Several illumination areas or respectively several photodetectors have different positions in the space. Several illumination areas can thus simultaneously illuminate a larger area of the boundary surface to be detected. When illuminating an illumination area under different angles, the light is reflected under different angels from the boundary surface to be detected. Several photodetectors can receive light emitted from the boundary surface under different angles. In the case of all aforementioned variants, the probability of finding an optimal reflection point is increased in the case of a certain arrangement of the projecting device and the imaging device with respect to the boundary surface to be detected, in that light projected on an illumination area is reflected such that it hits at least one photodetector. It delivers a corresponding measurement signal so that the evaluation device can determine the arrangement of the boundary surface in the illumination area. As a result, it is possible that an operation of the optical sensor system with respect to the boundary surface becomes superfluous. If an operation of the optical sensor with respect to the boundary surface is required because an optimal reflection point cannot be determined immediately, the optical sensor system can be moved with respect to the boundary surface until the evaluation device determines through evaluation of the measurement signal that an optimal reflection point of the boundary surface is located in an illumination area. The probability of the location of the optimal reflection point is additionally increased through the simultaneous displacement of the relative position of the at least one illumination area and the boundary surface in a direction diagonal to the direction and in the direction of the optical axis. The traverse paths for the location of the optimal reflection point can be reduced. Faster detection of the boundary surface is hereby enabled and the operating speed of an apparatus for treating liquids can be increased.

The named advantageous effects are achieved in particular when the projecting device simultaneously projects the light onto several illumination areas and/or simultaneously projects the light under different angles onto the same illumination area and only one single photodetector is available. Furthermore, they are achieved when the projecting device illuminates only one illumination area under only one angle and several photodetectors are available. In a particularly advantageous manner, they are achieved when the projecting device simultaneously illuminates several illumination areas and/or simultaneously illuminates the same illumination area under different angles and several photodetectors are available.

The optical sensor system can detect different types of boundary surfaces, in particular liquids or objects, in particular with diffusely or directly reflecting boundary surfaces. Thus, it can be used in particular for the determination of the position and/or identity of boundary surfaces or respectively of liquids or objects with them. The projecting device can generally project the light of a foreign light source. In accordance with one embodiment, the projecting device has at least one own light source. In accordance with another embodiment, the light source is at least a laser, an LED or a light bulb. The laser is for example a semiconductor laser, in particular a laser diode.

If the projecting device has several light sources, the light from different light sources can be projected absolutely simultaneously onto different illumination areas and/or simultaneously projected under different angles onto the same illumination area. However, the invention also comprises specifications in which the light from different light sources is projected time-delayed onto several illumination areas and/or projected time-delayed under different angles onto the same illumination area so that only one light source is switched on at a certain period of time. These specifications also enable faster detection of the boundary surface, in particular when the light sources are switched on in rapid succession, because the boundary surface can hereby be scanned much faster than through displacement of the known single-beam sensor system by means of the adjustment device. The successive switching on of the light source can be helpful to assign the measurement signals to the different light sources. Several successively switched on light sources thus illuminate the different illumination areas quasi simultaneously or respectively illuminate one illumination area under different angles quasi simultaneously and are thus switched on simultaneously in terms of the invention.

In accordance with one embodiment, the light source emits light with a wavelength that is reflected to a particularly strong degree by a boundary surface to be detected. Accordingly, light with a different wavelength than for the detection of the surface of an object can be used for the detection of the surface of a liquid. If light is used with a wavelength for which the liquid is almost up to fully opaque, the liquid level can be determined free of disturbance from close receptacle walls. If the liquid is transparent for light of a certain wavelength, the position of a receptacle bottom can be determined through the liquid with this light. The suitable wavelength for the detection of a liquid can be dependent on its composition (e.g. aqueous or organic solution). The suitable wavelength for the detection of the surface of an object can depend on its material (e.g. metal or plastic) and consistency (transparent, reflecting, shiny, matte, etc.). Wavelengths in a broad range, which includes visible and invisible light (IR and UV rays), are taken into consideration. Laser diodes are available in particular for the range of visible light.

In accordance with one embodiment, the projecting device has several light sources with different wavelengths, which can be switched on depending on the boundary surface to be detected. In accordance with another embodiment, the projecting device has a light source with an adjustable wavelength (e.g. a tunable laser diode).

These embodiments enable the detection of a boundary surface with light of different wavelengths. Invalid measurement values can be detected and dismissed after checking the measurement with light of a different wavelength. In particular when a receptacle only contains a very small amount of liquid, it is important to differentiate between the liquid and the bottom of the receptacle. This can be very difficult when measuring with light of only one wavelength. The use of light with different wavelengths facilitates the allocation, in particular when the wavelength is optimized depending the measurement case and material.

In accordance with one embodiment, the projecting device is a device for projecting light into at least one punctiform, linear or plane illumination area. The punctiform illumination area is particularly advantageous for the detection of small boundary surfaces, e.g. of liquid levels in narrow receptacles or in the wells of microplates. Moreover, by focusing the light on at least one punctiform illumination area, particularly string measurement signals are received when a punctiform illumination hits an optimal reflection point. For the generation of a punctiform illumination area, the at least one light source is punctiform according to one embodiment. In accordance with another embodiment, the projecting device in the beam path of the at least one light source has at least one aperture and/or at least one light conductor so that there is a quasi punctiform light source on the light emission side of the aperture or respectively of the light conductor.

The illumination areas can have different arrangements in the space. In accordance with embodiments, they have a three-dimensional arrangement or an arrangement in a surface. In accordance with another embodiment, the surface is a plane. In accordance with another embodiment, the illumination areas are arranged in a convex or concave surface or in surfaces tilted towards each other. These embodiments approximate characteristic forms of boundary surfaces (e.g. of liquid surfaces in narrow receptacles) and can thus facilitate the location of an optimal reflection point.

In the case of a three-dimensional arrangement, the illumination areas can be arranged in particular on the intersections of a space lattice. In the case of an arrangement in a surface, they can be arranged in particular on the intersections of a plane grid (or respectively grid-like) or in other patterns.

Several different illumination areas can in particular be separated or respectively discrete illumination areas. But they can also touch each other or otherwise cover each other.

In accordance with one embodiment, the light beam illuminating the least one illumination area has an aperture angle of 8° or less so that the light beam can be inserted into receptacles with comparatively small opening diameters and/or with greater depths without fading in the edge area. In particular, these can be receptacles with a fill volume in the mL range and lower, which are often used for receiving liquids in dosing stations and fully automated treatment stations.

In accordance with one embodiment, the distance between the at least one illumination area and the imaging system is 100 mm or more, whereby a contactless measurement of the liquid level in many conventional receptacles of the aforesaid type is possible.

The at least one illumination area can be generated in different manners. For example, the illumination area can be illuminated by a linear light beam, which can be generated by means of a laser. Through at least one imaging device, at least one punctiform illumination area can be defined on the linear light beam, which is imaged onto at least one photodetector.

In accordance with one embodiment, the projecting device has one single light source and at least one device for imaging the light source on at least one illumination area. This projecting device can illuminate in particular a single illumination area. For the simultaneous projecting of light onto several different illumination areas and/or for the simultaneous projecting of light onto the same illumination area under different angles, in accordance with one embodiment, the projecting device has a device for dividing the light source into several virtual light sources and at least one device for the imaging of the several virtual light sources onto at least one illumination area.

In accordance with one embodiment, the device for dividing the light source comprises a self-fanning light conductor and/or a multi-hole aperture. The self-fanning light conductor turns towards the non-fanned end of the light source and the fanned end of the imaging device. The virtual light sources are located on the fanned end of the fanned light conductor. The multi-hole aperture is arranged in the beam path between the light source and the imaging device. The multiple virtual light sources are defined by the aperture openings of the multi-hole aperture.

In accordance with another embodiment, the projecting device comprises several light sources and at least one device for imaging the several light sources onto at least one illumination area. In the case of this embodiment, the light of several light sources is drawn on for the simultaneous projecting of light onto several illumination areas and/or for the simultaneous projecting of light onto the same illumination area under different angles.

In accordance with another embodiment, the projecting device has a common device for the imaging of the several virtual light sources or the several light sources onto at least one illumination area.

In accordance with one embodiment, the at least one photodetector is punctiform, linear or plane. The at least one photodetector can for example be a photodiode, a photodiode line, a photodiode matrix or a surface photodetector. The shape of the photodetector preferably matches the shape of illumination area, which will be imaged onto the photodetector. Thus, a punctiform illumination area is preferable imaged onto a punctiform photodetector, a linear illumination area onto a linear photodetector and a plane illumination area onto a plane photodetector.

The photodetectors can have different arrangements in the space, for example a three-dimensional arrangement or an arrangement in a surface. The surface can in particular be a plane. The photodetectors can in particular be arranged on the intersections of a space lattice or a plane grid (or respectively grid-like) or in other patterns. The arrangement of the photodetectors preferably matches the arrangement of the illumination areas, wherein each illumination area is imaged onto one of these associated photodetectors. Thus, for example, the illumination areas and the photodetectors are each arranged on the intersections of a space lattice or a plane grid, wherein the separation distances between the illumination areas match the separation distances between the photodetectors.

The separation distances between the illuminations areas and/or between the photodetectors lie for example in the range of one tenth of a millimeter up to several millimeters.

The several photodetectors can in particular be separated or discrete photodetector or they can touch each other. Several photodetectors can be different components or parts of a single component.

A punctiform photodetector can be a photodetector with a particularly small light-sensitive surface. In accordance with one embodiment, at least one aperture and/or at least one light conductor is arranged in the beam path between the at least one imaging device and the at least one photodetector. The aperture or respectively the light conductor limits the light passage onto a punctiform area of the light-sensitive surface of the photodetector so that a quasi punctiform photodetector is achieved.

In accordance with one embodiment, a single photodetector and at least one device for the imaging of at least one illumination area onto the photodetector are present. The at least one imaging device preferably images several illumination areas onto the single photodetector in order to facilitate the location of an optimal reflection point. However, specifications are also included in which the imaging device only images one illumination area onto the photodetector, onto which light is projected under different angles, in order to project light under an angle of incidence onto the illumination area, for which the reflection point is optimal.

In accordance with one embodiment, a device for the merging of light is arranged between the at least one imaging device and the photodetector. The merging device has several inlets, through which the light can enter. The entered light is merged in the merging device and supplied to the photodetector through a common outlet. In accordance with another embodiment, the device for the merging of light has unifying light conductors.

In accordance with one embodiment, several photodetectors and at least one device for the imaging of at least one illumination area onto several photodetectors are present. The several photodetectors increase the probability of receiving reflected light from a single illumination area. If several illumination areas are present, the several photodetectors increase the probability of receiving reflected light from at least one illumination area.

In accordance with one embodiment, the projecting devices and the at least one imaging device are arranged coaxially. This benefits the capturing of boundary surfaces in narrow receptacles and the scanning of objects with heavily structured surfaces.

In accordance with one embodiment, the light from the at least one light source is supplied to the device for the imaging of the at least one light source onto the at least one illumination area via a beam splitter and the same imaging device images the at least one illumination area onto the at least one photodetector via the beam splitter. Reflected-light measurement is hereby enabled. Since there is only one imaging device, the effort is comparatively small.

In accordance with one embodiment, the at least one device for the imaging of the at least one light source and/or the at least one device for the imaging of the at least one illumination area has a lens and/or several adjacent lenses and/or a lens array and/or a Fresnel lens. Several lenses arranged adjacent and diagonal to the axis of the imaging device, the lens array and the Fresnel lens are drawn on in particular for the imaging of several light sources or virtual light sources onto at least one illumination area and/or for the imaging of at least one illumination area onto several photodetectors.

In accordance with one embodiment, the evaluation device has means for filtering the measurement signal delivered by the at least one photodetector. Noise components of the measurement signal can hereby be suppressed and foreign light influences and other disturbances can be switched off. For example, the measurement signals delivered by the photodetector during the displacement of the at least one illumination area in a direction diagonal to and in the direction of the optical axis is deflected and the boundary area is determined at the position where the deflection of the value null is assumed. Other evaluation procedures (e.g. logarithmic, integration of higher order) for the filtering of the noise signals out of the measurement signal are available. The sensitivity of the optical sensor system and the speed of the detection of boundary surfaces by means of the optical sensor system increase through the filtering of the measurement signals.

In accordance with another embodiment, the relative position of the optics and the boundary surface formed by the at least one projecting device, the at least one imaging device and the at least one photodetector can be adjusted by means of the adjustment devices. For this, the optical sensor system and/or the boundary surface, which is e.g. arranged on an object holder, can be displaced, e.g. by means of a horizontally and vertically (in the direction of the X, Y and Z axis) moveable transport device.

In accordance with another embodiment, the adjustment device has a zoom objective and/or an autofocus system in the at least one imaging device for the adjustment in the direction of the optical axis of the at least one imaging device. For adjustment diagonal to the optical axis, the adjustment device can have at least one scan mirror in the at least one imaging device.

In accordance with one embodiment, the adjustment devices are motor-driven, e.g. for integration into an automated device for the treatment of liquids.

The control device controls the adjustment of the relative position of the at least one illumination area and the boundary surface by the adjustment devices. The control device together with the evaluation device can perform the adjustment depending on the measurement signals in order to position at least one illumination area on the boundary surface and/or to move along the boundary surface.

In accordance with one embodiment, the evaluation device determines the position and/or the identity of boundary surfaces or respectively of liquids or objects with them. The identity of liquids and objects can e.g. be determined by scanning their boundary surfaces with light of certain wavelengths and comparing the measurement signals with reference data. The identity of objects can be determined by comparing the profile of the boundary surface determined through scanning with reference data. The reference data can be saved, e.g. after determination through previous scanning of reference liquids or respectively reference objects. The results of these determinations can be used to automatically control the actions of the device for the treatment of liquids.

In accordance with another embodiment, the evaluation device captures the position and/or the identity of boundary surfaces in receptacles (e.g. reaction receptacles or wells in microtiter plates) and/or of labware (so called "lab products", e.g. reaction receptacles, microtiter plates, pipette tips) and/or of tools.

In accordance with one embodiment, the optical sensor system is arranged on an automated device for the treatment of liquids.

In accordance with one embodiment, the evaluation device is an evaluation device for capturing an optically scannable marking on objects. The optically scannable marking is for example a barcode or linear symbology arranged on an object or a coded arrangement of holes or lines of a pattern on the object.

In the case of the method according to the invention for the scanning of boundary surfaces of liquids in lab receptacles and lab objects, light is projected in the direction of an optical axis onto at least one illumination area in the space, the relative position of the at least one illumination area and the boundary surface is changed in a direction diagonal to the optical axis and simultaneously in the direction of the optical axis, the at least one illumination area is imaged onto at least one photodetector and the measurement signal of the photodetector is evaluated.

Through the simultaneous change in the relative position of the at least one illumination area and the boundary surface in a direction diagonal to the optical axis and in the direction of the optical axis, a larger surface is scanned in one time segment than in the case of the conventional procedure. This is the case in particular in the case of a quick deflection of the illumination area diagonal to the optical axis. The deflection can be restricted to the close-up area of the optical axis, which approximately corresponds with the size of the cross-section of the receptacles, in which the liquid level needs to be scanned. Included in the simultaneous displacement in the direction diagonal to the optical axis and in the direction of the optical axis is the absolutely simultaneous displacement and the quasi simultaneous displacement, in which a displacement in a direction diagonal to the optical axis and a displacement in the direction of the optical axis takes place in quick succession alternately or respectively chronologically overlapping each other. During the change in the relative position of the at least one illumination area and of the boundary surface, the at least one illumination area is imaged on at least one photodetector. It can be determined through evaluation of the measurement signal of at least one photodetector whether the boundary surface is located in the least one illumination area. During the location of the boundary surface in the at least one illumination area, the change in the relative position of the at least one illumination area and of the boundary surface can be cancelled.

The invention comprises methods, in which the illumination area or the boundary surface or the illumination area and the boundary surface can be moved in a direction diagonal to the optical axis and in the direction of the optical axis. Insofar as the displacement of the illumination area diagonal to the optical axis and in the direction of the optical axis is referred to below for the purposes of simplification, these specifications also apply analogously to the other displacement possibilities.

The illumination area is an area in the space, onto which the light is projected.

In accordance with one embodiment, the axis of the projection of the light onto the at least one illumination area is pivoted with respect to the optical axis and/or displaced parallel to the optical axis.

In accordance with another embodiment, the at least one illumination area is displaced diagonal to the optical axis in a spiral and/or cycloid and/or zigzag and/or accidental and/or chaotic and/or continuous and/or broken manner.

In accordance with another embodiment, the at least one illumination area is displaced within specified limits around the optical axis.

In accordance with another embodiment, the optical axis is arranged vertically.

In accordance with another embodiment, the least one illumination area is displaced further and further from the optical axis up to a maximum distance from the optical axis and/or the least one illumination area is moved from a maximum distance from the optical axis closer and closer to the optical axis. This can also be performed multiple times and/or in the opposite order.

In accordance with another embodiment, the at least one illumination area is displaced repeatedly from the optical axis until a maximum distance from the optical axis and from the maximum distance to the optical axis is reached. This can also be performed repeatedly and/or in the opposite order.

In accordance with another embodiment, the maximum measurement signal is determined during the displacement of the at least one illumination area in the direction diagonal to the optical axis and/or in the direction of the optical axis.

In accordance with another embodiment, after determination of a maximum measurement signal, the at least one illumination area will be positioned approximately onto the or at a smaller distance from the position along the optical axis, in which the maximum measurement signal was determined and the maximum measurement signal of at least one photodetector is again determined during the displacement of the at least one illumination area in the direction diagonal to the optical axis and in the direction of the optical axis, wherein the at least one illumination area is displaced around a short path and/or with a lower speed than before.

In accordance with another embodiment, the position of the at least one illumination area is determined at the maximum of the measurement signal as the position of the boundary surface and/or as the position of the optimal reflection point on the boundary surface.

In accordance with another embodiment, light is simultaneously projected onto several illumination areas and/or light is projected under different angles onto the same illumination area and/or at least one illumination area is imaged onto several photo detectors.

This embodiment determines the spatial position of the boundary surface in the vertical direction (or respectively in the direction of the Z axis), i.e. in or opposite the direction of earth's gravitation. A determination of the position in the horizontal direction (or respectively in the direction of the X and Y axis) and the assignment of the optimal reflection point to a specific point on the boundary surface can be omitted. The detection of the liquid level is hereby accelerated.

In accordance with one embodiment, the position of the at least one illumination area is changed in the diagonal direction with respect to the vertical if no maximum of the measurement signal of at least one photodetector is determined during the changing of the vertical distance between the illumination area and the boundary surface and then a maximum of the measurement signal is again sought while changing the vertical distance of the at least one illumination area and the boundary surface. These additional steps only need to be performed if no maximum of the measurement signal is determined during the first change in the vertical distance.

In accordance with one embodiment, light is projected in the direction of a boundary surface onto at least one illumination area, the distribution of the reflected light quantity is determined by means of several photodetectors and the probable position of the optimal reflection point on the boundary surface and/or the probable position and/or the probable identity of the boundary surface is determined based on the determined light quantity distribution.

In this embodiment, the probable position of the boundary surface and/or of the optimal reflection point on the boundary surface and/or the probable identity of the boundary surface or respectively the liquid with it or the object with it is concluded from the distribution of the reflected light. The measurement signals delivered by several photodetectors are evaluated accordingly. The information on the probable position or respectively the probable identity is sufficient for most applications, for example when it only needs to be determined whether a receptacle has any liquid, whether an object arrived at the end of a process or whether a certain type of object (e.g. a microplate with 384 wells) is present. The exact determination of the position or the exact identification of the boundary surface can be accelerated in a subsequent step according to one embodiment, because measurements can already be performed in a targeted manner after evaluation of a few measurement signals. For this, according to one embodiment, the at least one illumination area is positioned onto the probable location of the boundary surface or respective of the optimal reflection point and the measurement is repeated.

In accordance with one embodiment, light is projected onto several illumination areas, the illumination areas move over the boundary surface, each boundary surface is imaged onto a photodetector assigned to it and the measurement signals provided by the several photodetectors are compared and a measurement error is determined in the case of a deviation.

In the case of this embodiment, the surface of objects is scanned multiple times and the measurement signals are used to determine measurement errors. The determination of the measurement errors can be the starting point for a new scan of the boundary surface of the object. But a correction can also be performed in that the measurement signals are used for further scan, which are obtained in a single step, for the correction of a faulty measurement. For this process, all channels of the optical sensor system or only a portion of them can be used. It can in particular be used to scan a barcode, a linear symbology, a coded arrangement of holes or lines of a pattern on an object. But the procedure is also suitable for the scanning of boundary surfaces for the identification of objects.

The optical sensor system can generally also be used to identify or determine the position of objects. The projection axis is thereby preferably not displaced with respect to the optical axis. For this application, it is more important that the signal of the photodetector changes clearly when the illumination area hits the edge of the body so that the evaluation device can determine the more exact location of the edge of the body via the allocation of the movement data. In the case of a multichannel optical sensor system, only one channel is preferably used, i.e. in that one single illumination area is generated by means of a single beam of light, which is imaged onto one single photodetector. The multichannel optical sensor system can be converted to a single-channel optical sensor system through suitable measures, e.g. by reading out just one photodetector and/or by covering illumination areas with suitable apertures of the projecting device and/or by switching off light sources. The system is then able to capture the position of objects in the space via horizontal movements (in the X and Y direction) of the adjustment device.

In accordance with one embodiment, the determined positions and/or identities of boundary surfaces are saved and/or used to control and/or to check a method for the treatment of liquids. The determined values can be saved in data storage units and used to determine liquid volumes or respectively to determine the position of objects. Furthermore, the data determined according to the above methods can be made available via a bus system of a control device, which in turn controls a device for the treatment of liquids.

In accordance with one embodiment, the positions and/or identities of boundary surfaces and/or of objects are determined at the beginning of a method for the treatment of liquids and/or are determined again during the progression of a method for the treatment of liquids and/or starting from the determined positions and/or identities changes in the states are calculated through the method for the treatment of liquids. Depending on the requirements of the method for the treatment of liquids, liquid volumes can be removed from and added to certain receptacles using a pipetting device. The changes in the volumes in each receptacle can be calculated and logged by a control device and saved for further steps of the method for the treatment of liquids. A new determination of the position of the boundary surfaces of liquids is then generally no longer necessary. Furthermore, objects can be moved via a gripping device or another transport device according to the method for the treatment of liquids. It is hereby also generally not required to determine the new position or the absence of the objects at a specific location, since the new position can be calculated. It is thus generally sufficient to determine the states (positions and/or identities of boundary surfaces or respectively of liquids or objects with them) at the beginning of the process for the treatment of liquids using the optical sensor system if it was not specified by the user.

In accordance with another embodiment, the calculated values are checked through a new determination of the positions and/or identities. With each intermediate state of the method for the treatment of liquids, the previously executed commands and actions can be checked and the values in this intermediate state can be saved.

In accordance with another embodiment, the determined and/or calculated positions and/or identities are archived and/or output. After completion of the method, a check of all executed commands and actions is possible using the optical sensor for quality assurance and validation. The results can be saved and/or output for archiving and/or verification management.

BRIEF DESCRIPTION OF EACH OF THE FIGURES OF THE DRAWINGS

Figure 1:
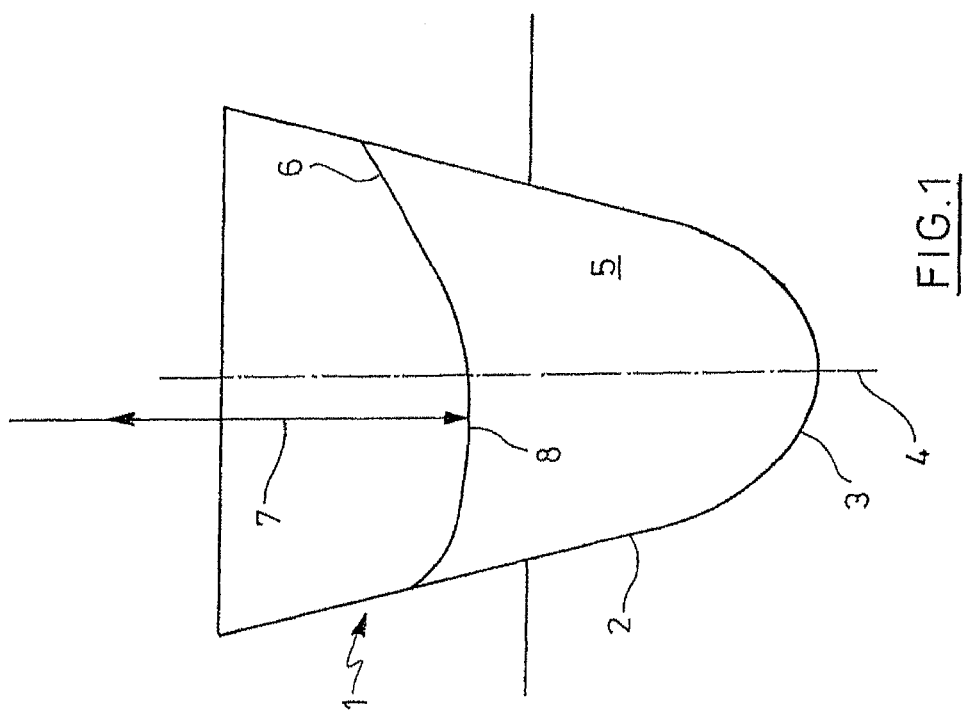
Figure 3:
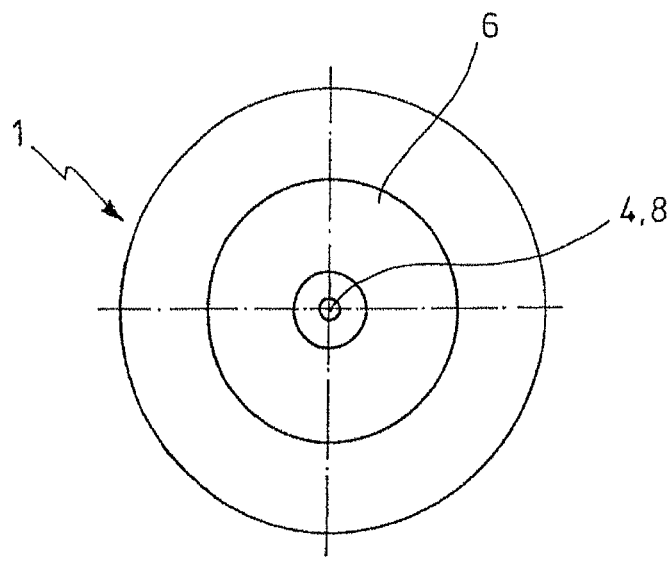
Figure 4:
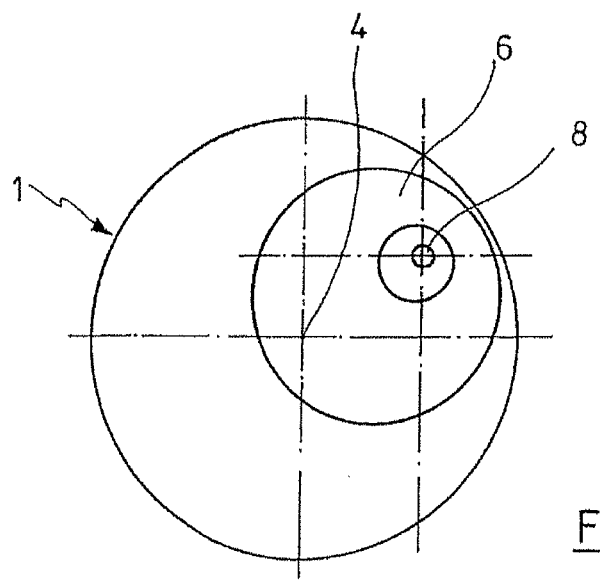
Figure 6A:
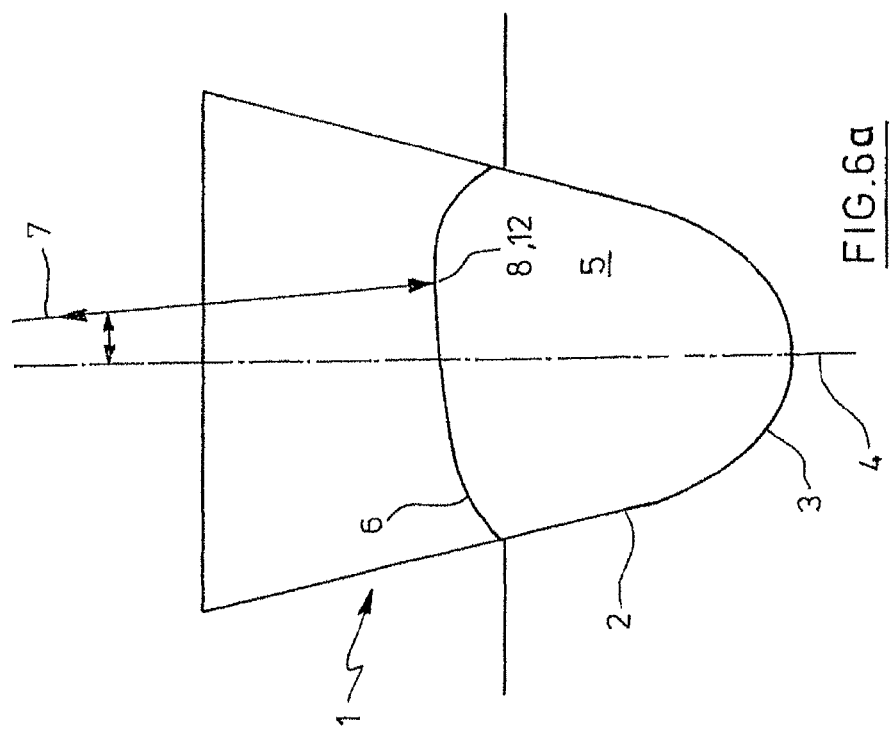
Figure 5A:
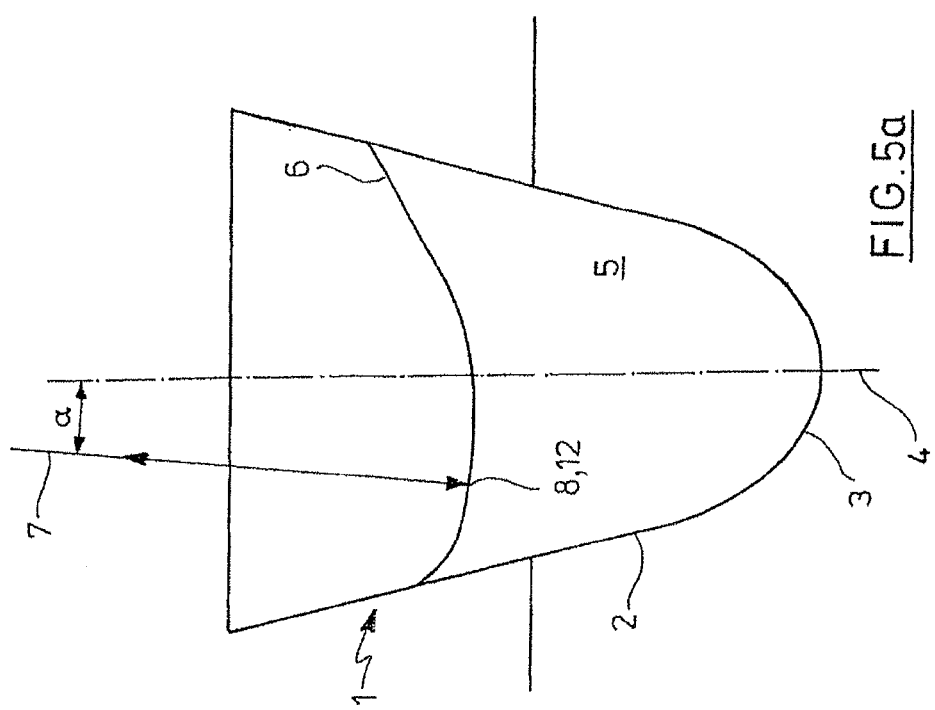
Figure 7A:
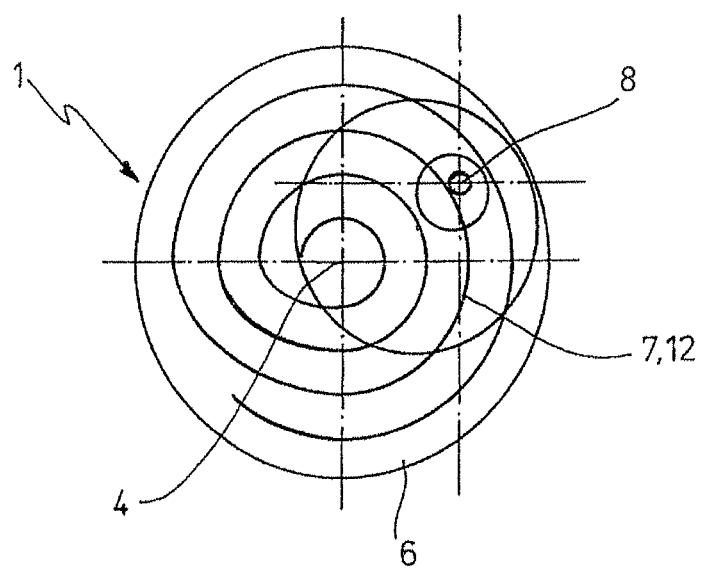
Figure 7B:
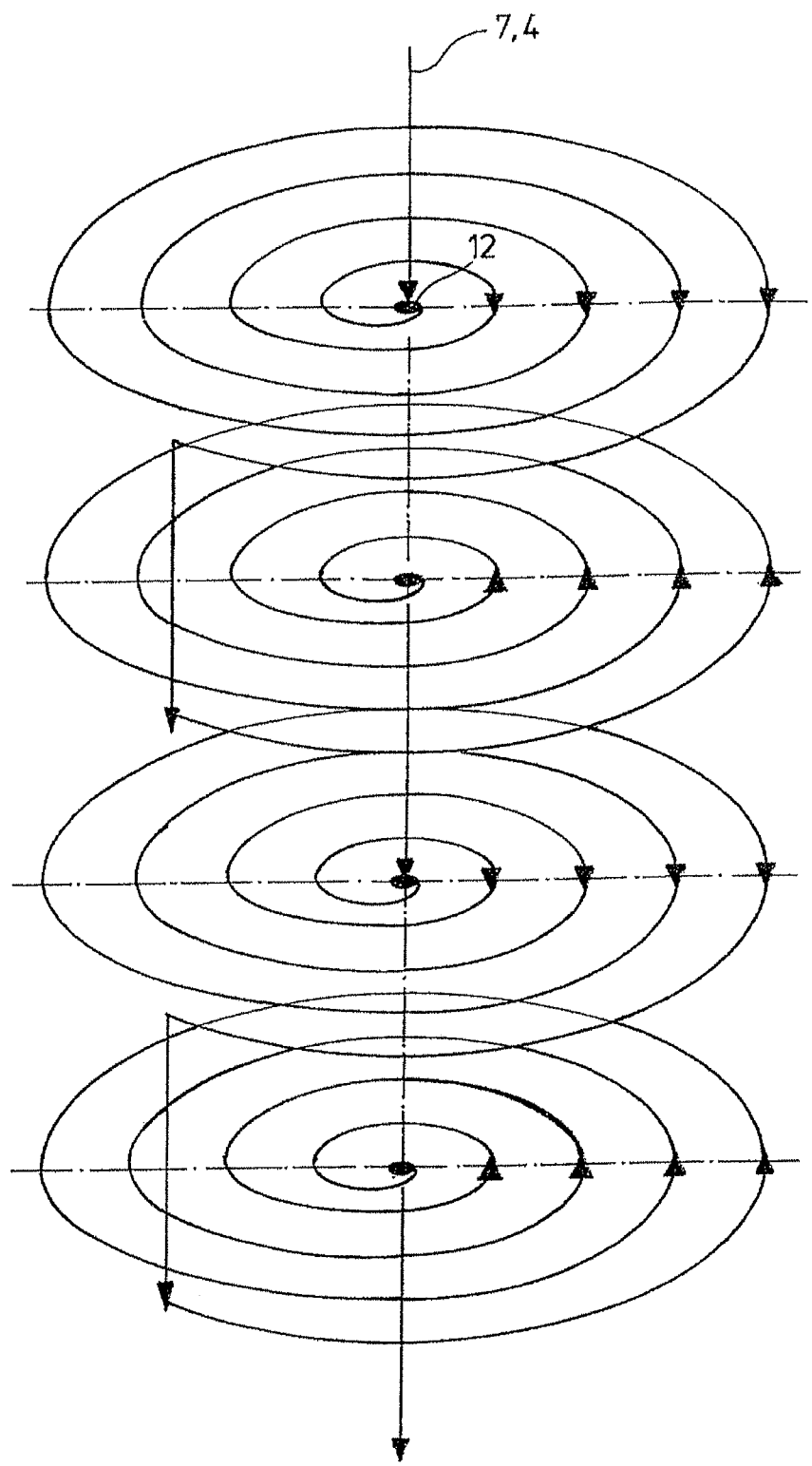
Figure 7D:
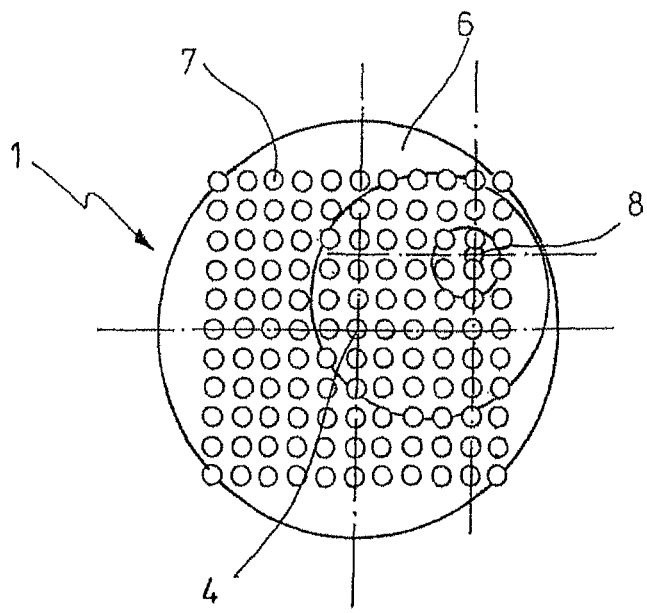
Figure 14:
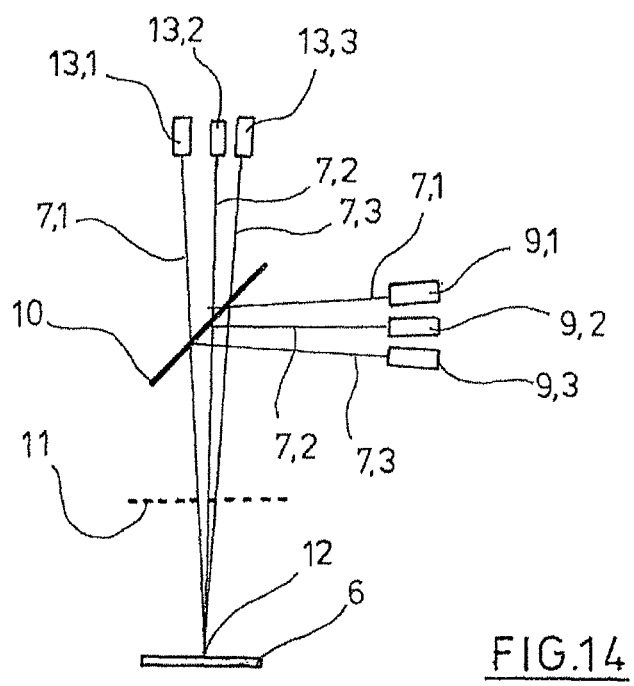
Figure 15:
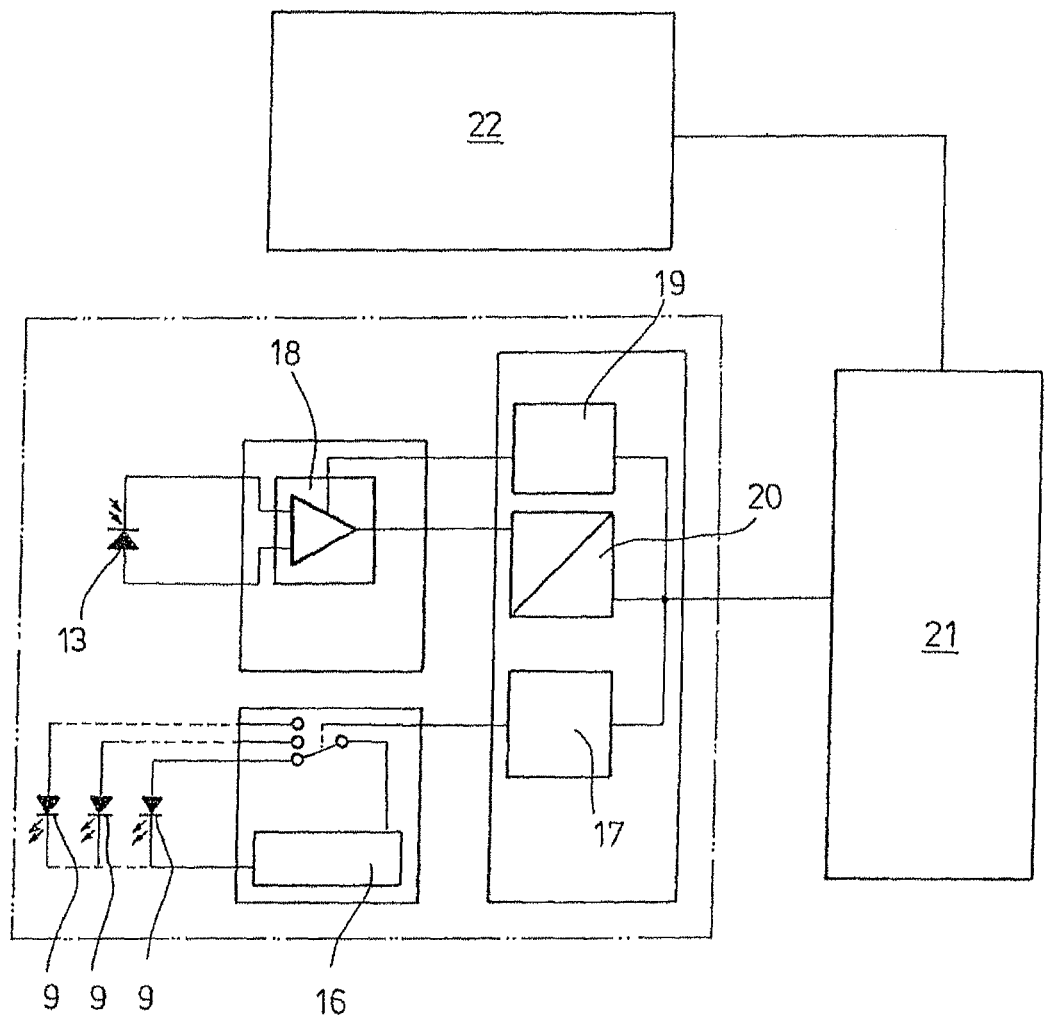
Figure 16:
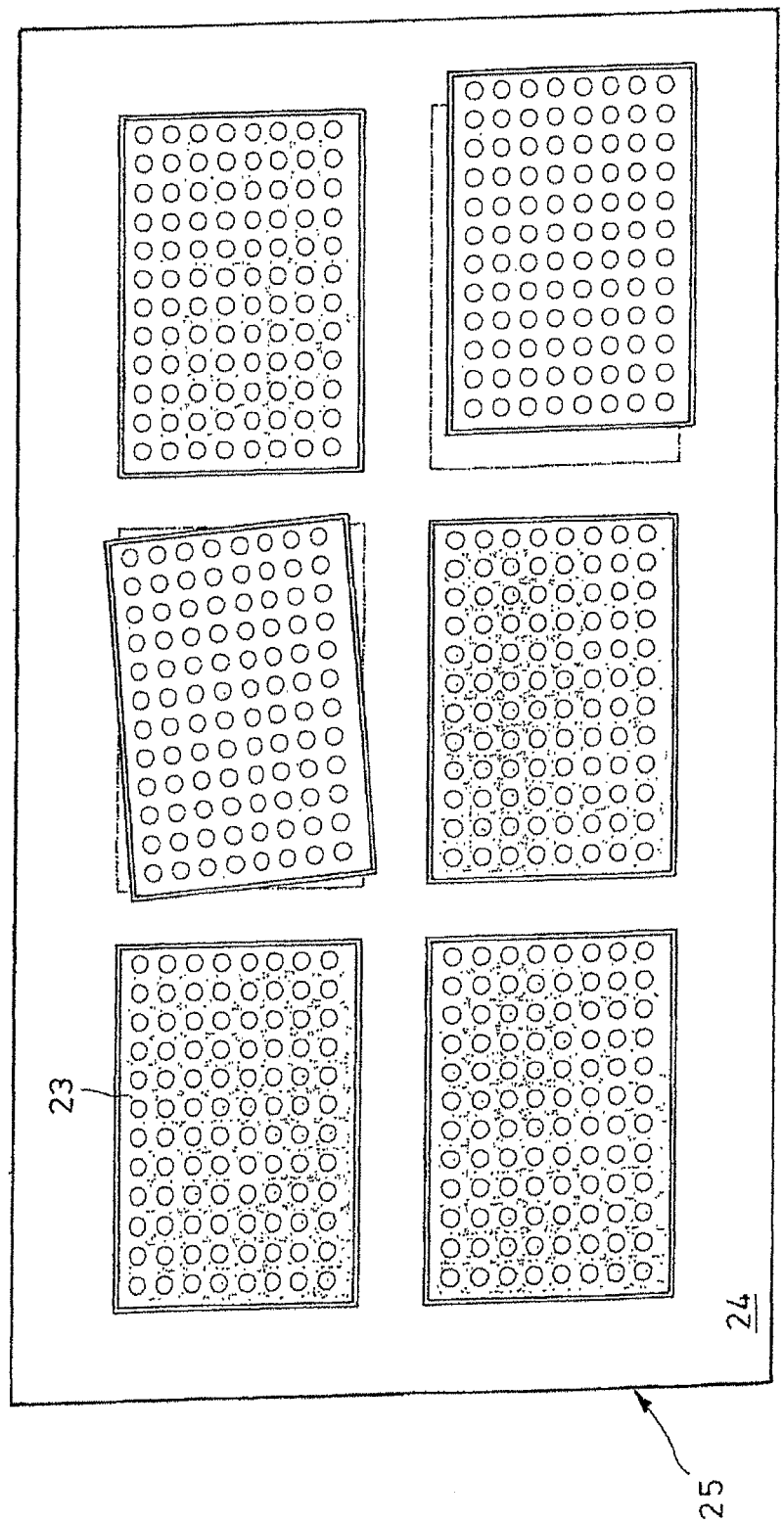
Figure 17:
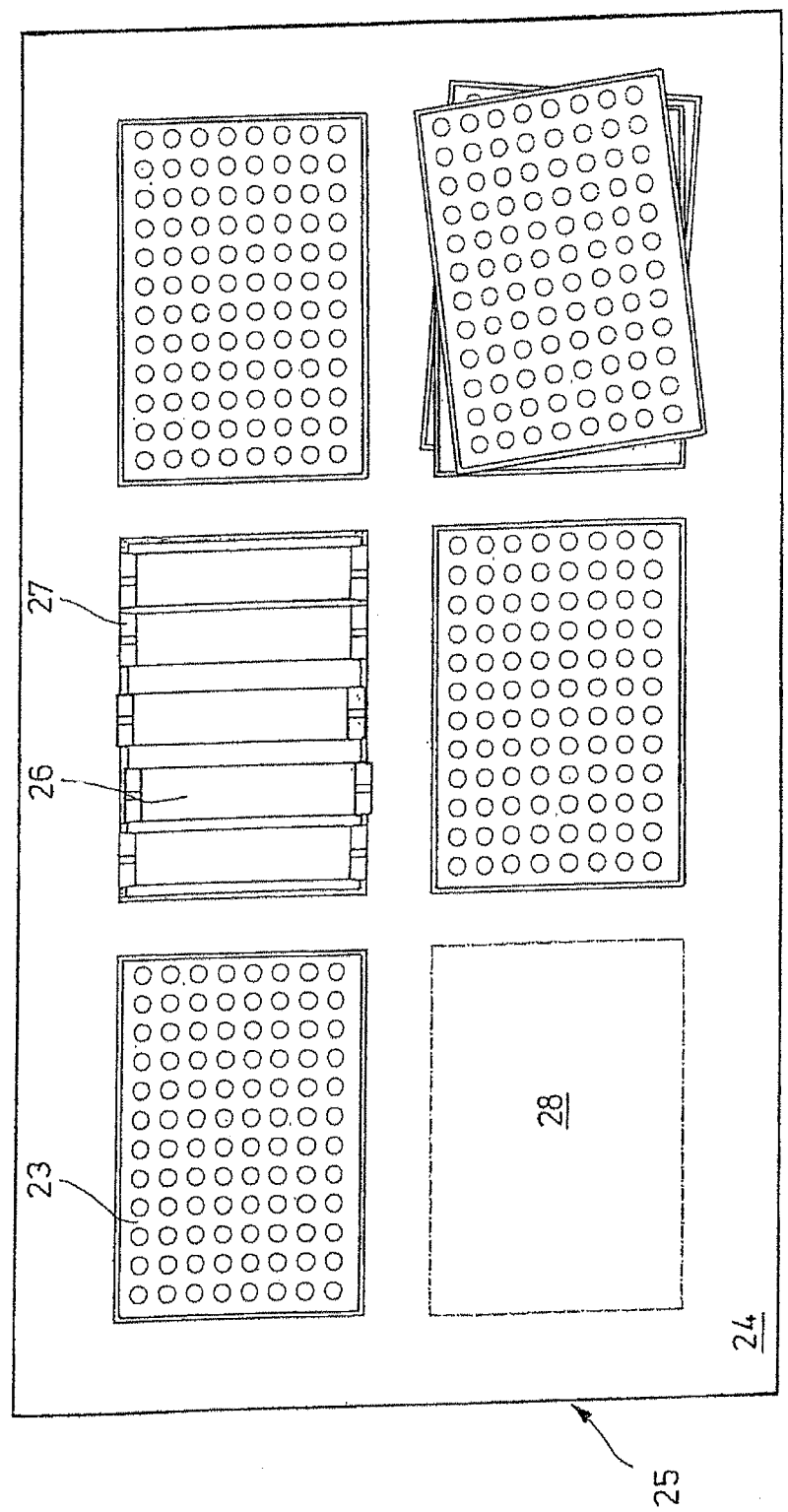
Figure 18:
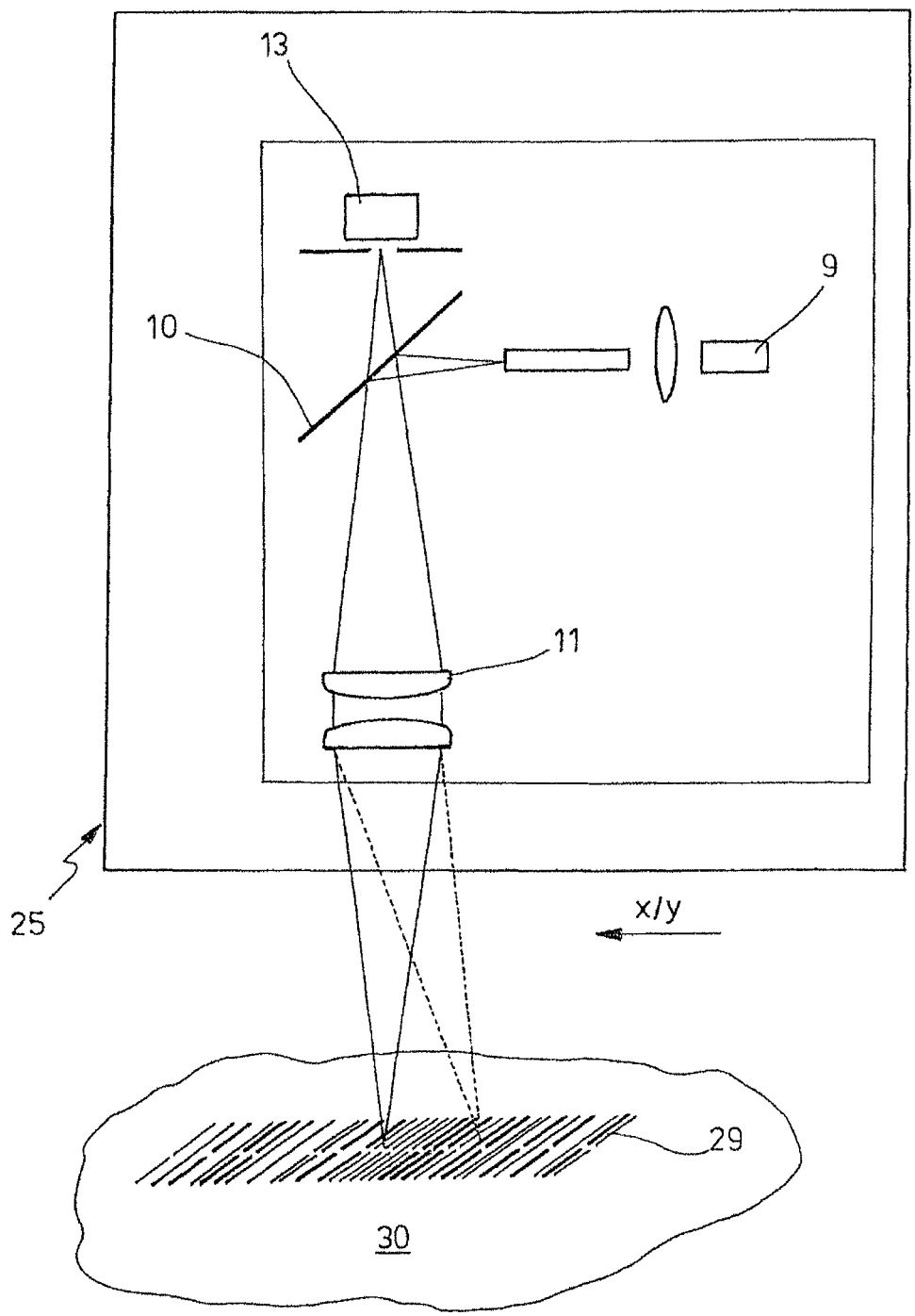
Figure 19:
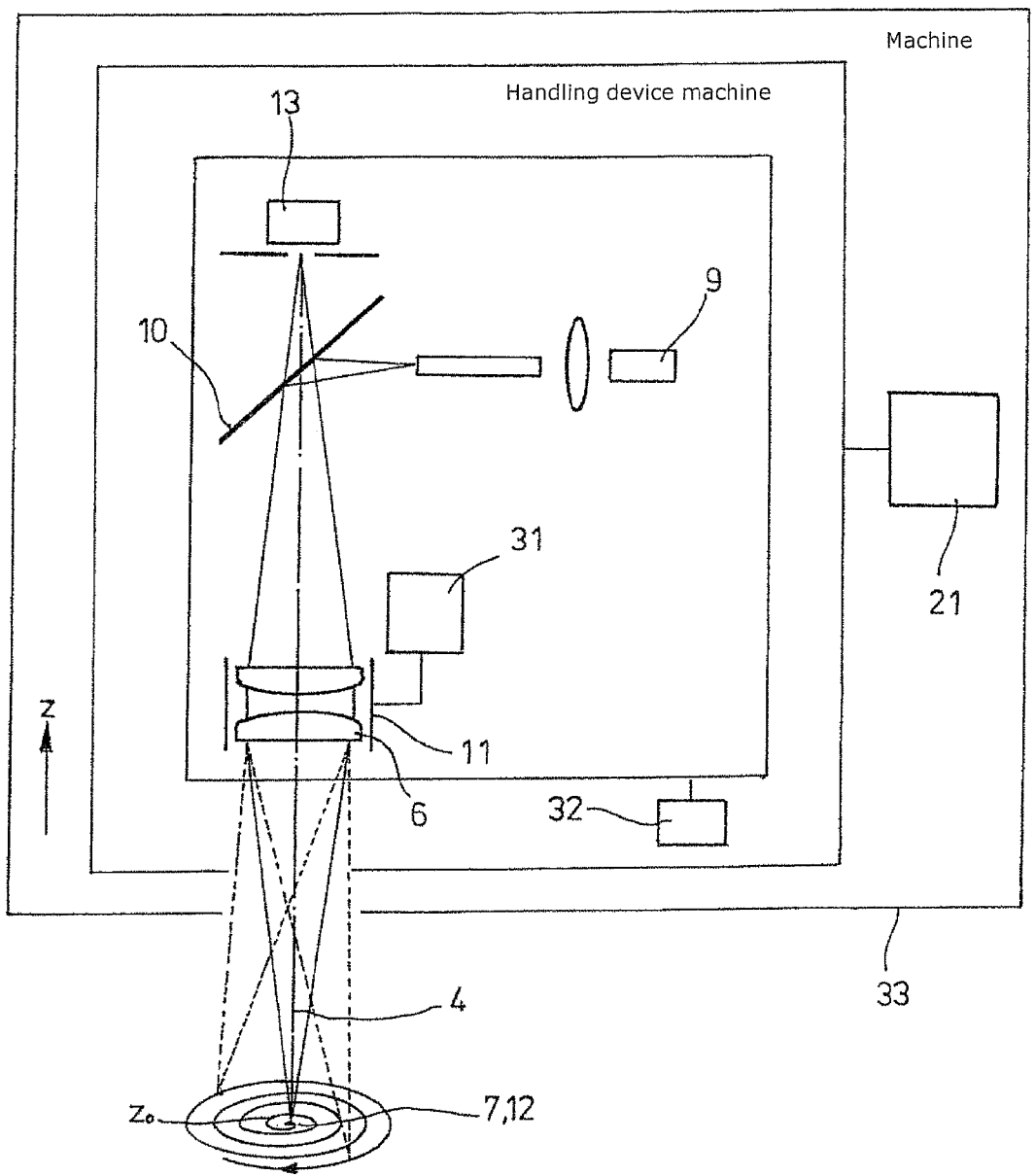
Figure 20:
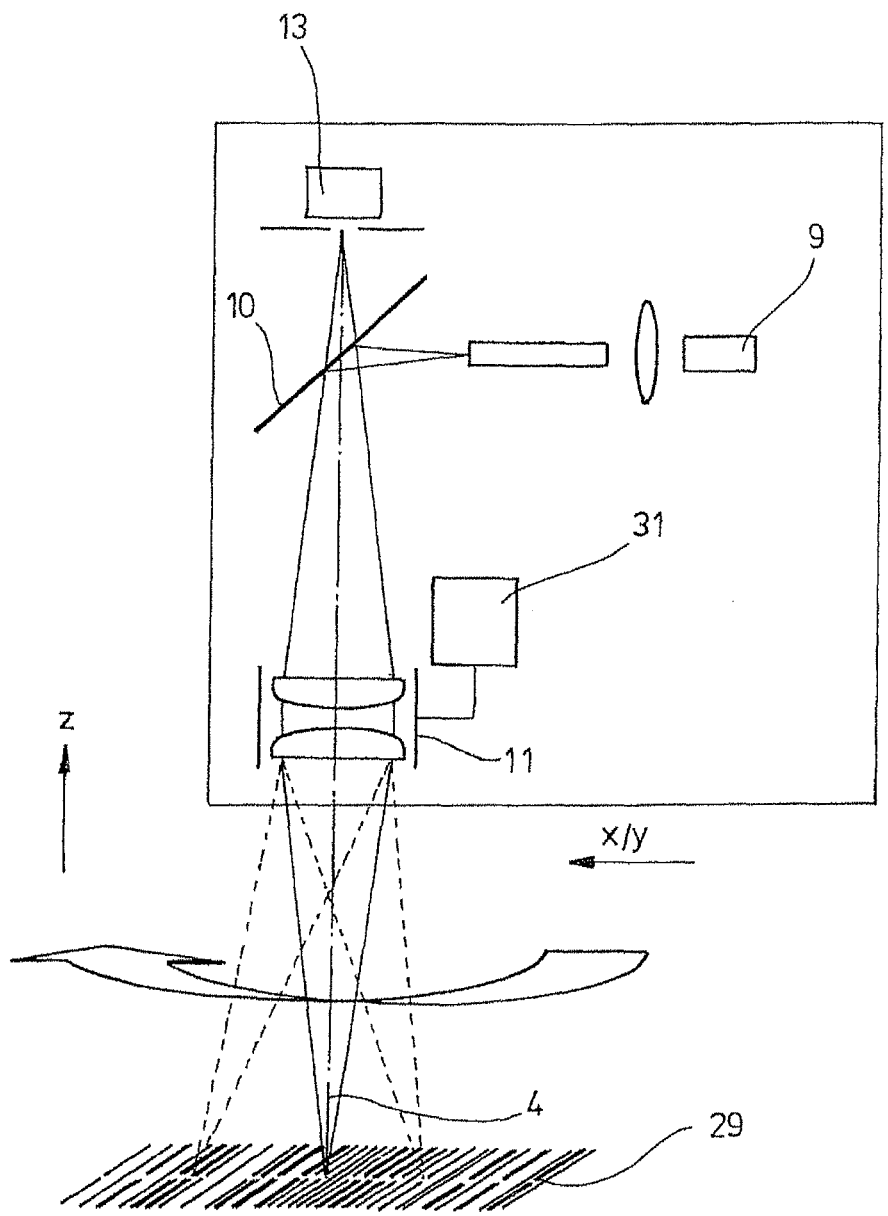
Figure 21:
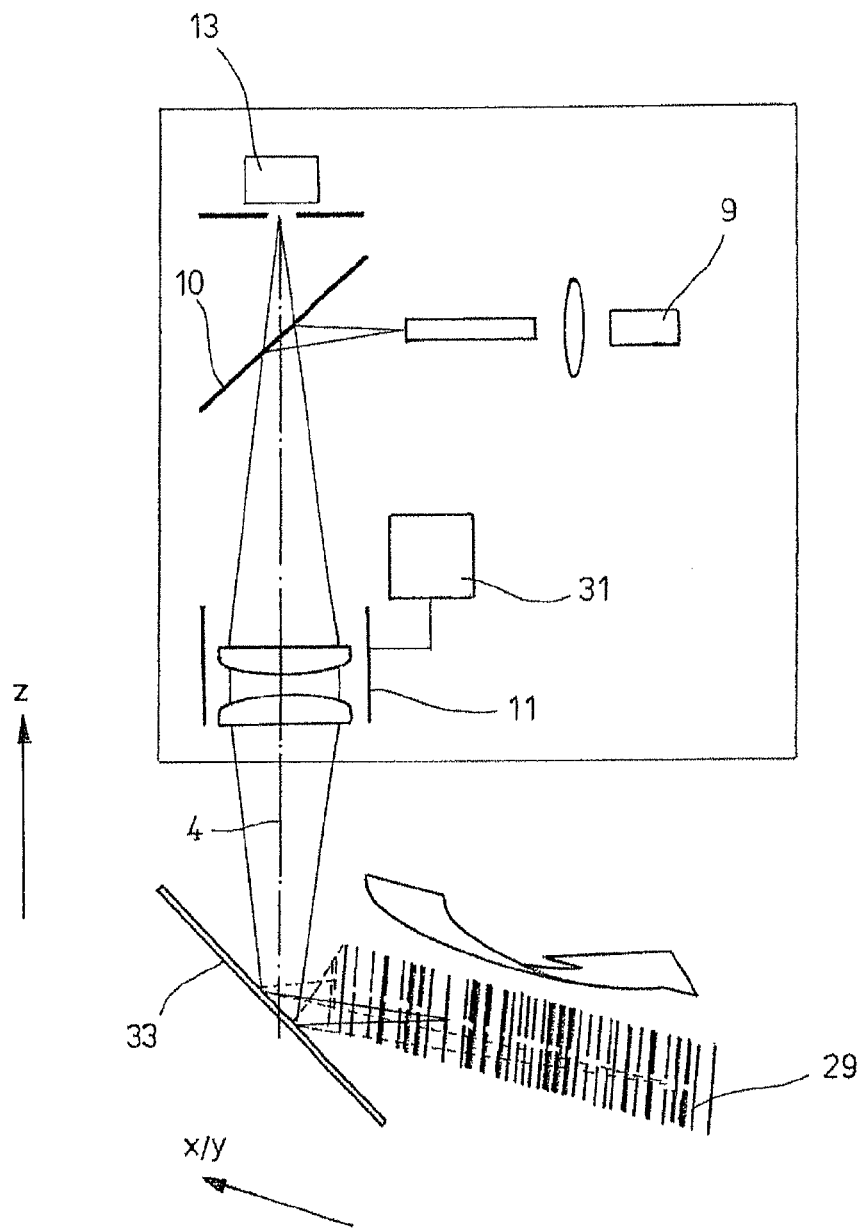

The invention is explained in greater detail below with reference to the attached drawings of exemplary embodiments. The drawings show the following:

FIG. 1 a vertical section of a light beam at an optimal reflection point of a concavely curved boundary surface of a liquid in a receptacle;

FIG. 2 a vertical section of a light beam at an optimal reflection point of a convexly curved boundary surface of a liquid in a receptacle;

FIG. 3 a top view of the position of an ideal reflection point of a boundary surface of a liquid in a receptacle;

FIG. 4 a top view of the position of a real reflection point of a boundary surface of a liquid in a receptacle;

FIG. 5a, b and c a vertical section of a deflected light beam (FIG. 5a), a rotating light beam (FIG. 5b) and several parallel light beams (FIG. 5c) on a concavely curved boundary surface of a liquid in a receptacle;

FIG. 6a, b and c a vertical section of a deflected light beam (FIG. 6a), a rotating light beam (FIG. 6b) and several parallel light beams (FIG. 6c) on a convexly curved boundary surface of a liquid in a receptacle;

FIG. 7a and d a top view of the real boundary surface of a liquid in a receptacle by means of a spirally displaced light beam (FIG. 7a) of several light beams arranged in a matrix-like manner (FIG. 7d);

FIG. 7b and c displacement of spirally adjusted illumination areas in the direction of the optical axis gradually at different levels (FIG. 7b) and continuously (FIG. 7c);

FIG. 8 a schematic side view of an optical sensor system with several light sources and several photodetectors;

FIG. 9 a schematic side view of an optical sensor system with several virtual light sources and several photodetectors;

FIG. 10 a schematic side view of an optical sensor system with several virtual light sources and a photodetector with prior light merging;

FIG. 11 a schematic side view of an optical sensor system with several light sources and a photodetector with prior light merging;

FIG. 12 a schematic side view of an optical sensor system with a light source with diverging light beams and several photodetectors with converging alignment;

FIG. 13 a schematic side view of an optical sensor system with diverging light beams directed at inclined boundary surfaces and several parallel photodetectors;

FIG. 14 a schematic side view of an optical sensor system with several light source with light beams directed at a common illumination point under different angles and several photodetectors aligned with it;

FIG. 15 block circuit diagram of an optical sensor system according to FIG. 10;

FIG. 16 a top view of an exemplary arrangement of microtiter plates in a device for the treatment of liquids with an optical sensor system in particular for position determination and identification of lab products;

FIG. 17 an exemplary arrangement of lab products in a device for the treatment of liquids with an optical sensor system in particular for position determination and identification of lab products;

FIG. 18 a schematic side view of an optical sensor system during scanning of a barcode;

FIG. 19 a side view of an optical sensor system with an adjustable projection and imaging device for spiral scanning of a boundary surface;

FIG. 20 an optical sensor system according to FIG. 19 during scanning of a barcode;

FIG. 21 an optical sensor system according to FIG. 19 during the scanning of barcode attached to the side of an object;

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In the below description, analogous parts of different exemplary embodiments are labeled with the same reference numbers.

FIG. 1 through 7 show examples for the formation of the liquid level in a reaction receptacle with a volumetric capacity in the range of a fraction of a milliliter up to a few milliliters. Such reaction receptacles are marketed e.g. by the applicant under the name "Eppendorf Röhrchen" or respectively "Eppendorf Tubes".

The receptacles 1 are conical in the lower area 2 and have receptacle bottom 3 bent inward concavely. The receptacles 1 are aligned vertically with their axis 4.

In accordance with FIG. 1, a liquid 5 arranged in receptacle 1 has a concavely bent "meniscus" or respectively boundary surface 6.

A light beam 7 directed parallel to the receptacle axis 4 onto the boundary surface 6 hits the boundary surface 6 perpendicular at an optimal reflection point 8. From the optimal reflection point 8, it is reflected parallel to the receptacle axis 4. An apparatus for capturing boundary surfaces according to FIG. 1 of the EP 1 288 635 A2 can determine the position of the boundary surface 6 during alignment of the light beam onto the optimal reflection point 8.

FIG. 2 shows the optimal reflection point 8 on a convexly curved boundary surface 6 in the receptacle 1.

According to FIG. 3, the optimal reflection point 8 is ideally arranged on the center axis 4 of the receptacle 1. If the position of the receptacle 1 is known, the fill level can be easily determined by means of the apparatus for the capturing of boundary surfaces as per EP 1 288 635 A2. In accordance with FIG. 4, the optimal reflection point 8 is arranged outside of the center in reality. A sensor system as per EP 1 288 635 A2 must be moved vertically and horizontally in order to find the optimal reflection point 8.

According to the invention and FIGS. 5a and 6a, a light beam 7 is deflected from the receptacle axis 4, which at the same time is an optical axis of a projecting device. In FIGS. 5a and 6a, the light beam 7 is shown hitting the optimal reflection point 8 on the boundary surface 6 in the receptacle. In this situation, the reflected light is detectable by means of a photodetector (not shown), which is directed at the reflection point 8.

Figure 6B:
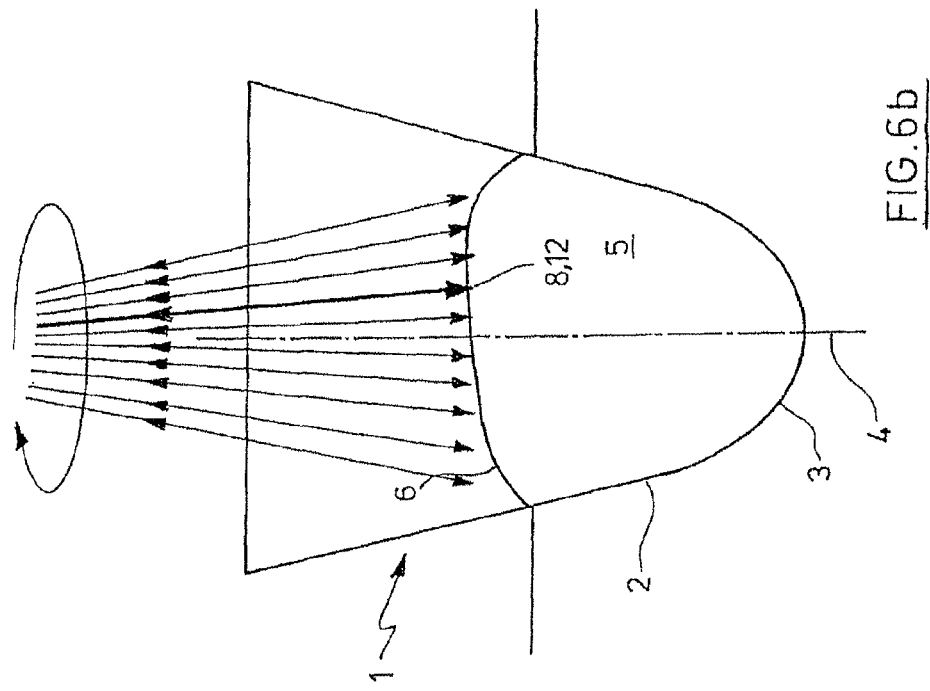
Figure 5B:
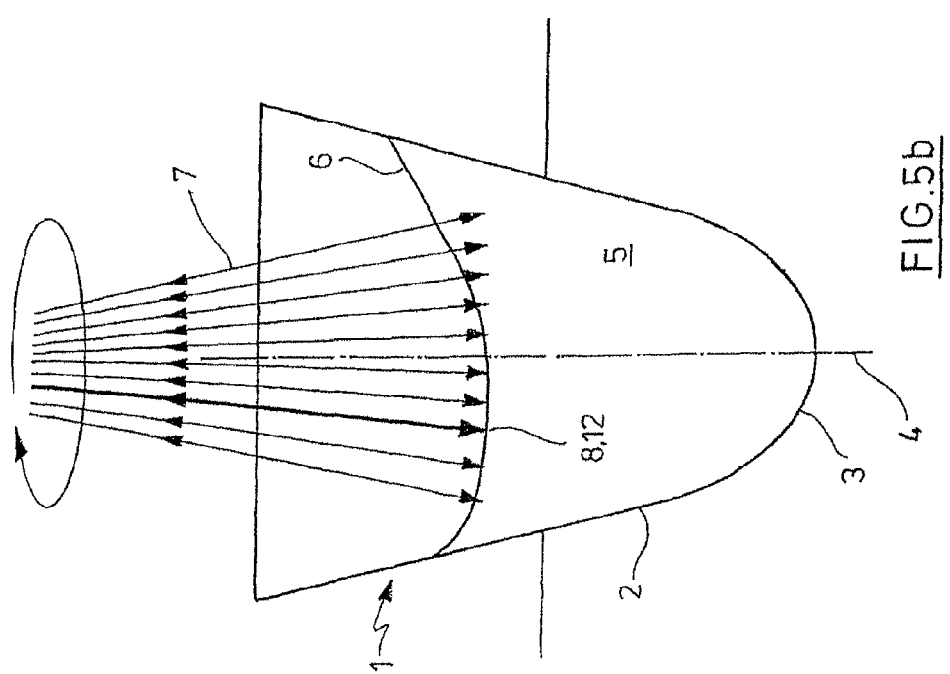

FIGS. 5b and 6b show the rotating light beam 7 during scanning of the boundary surface 6. The light beam 7 directed at the optimal reflection point 8 is graphically highlighted.

Figure 6C:
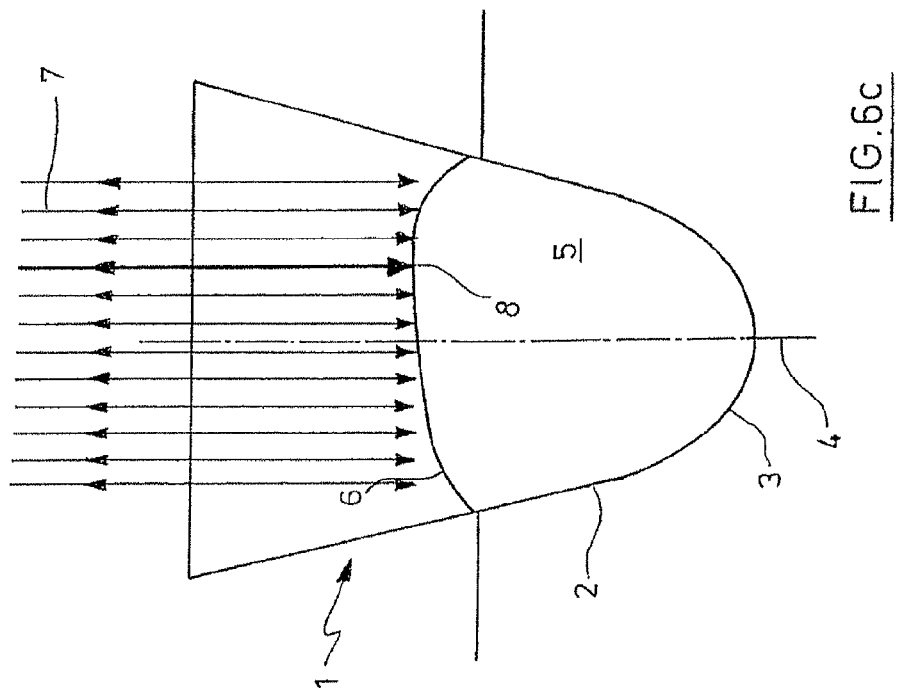
Figure 5C:
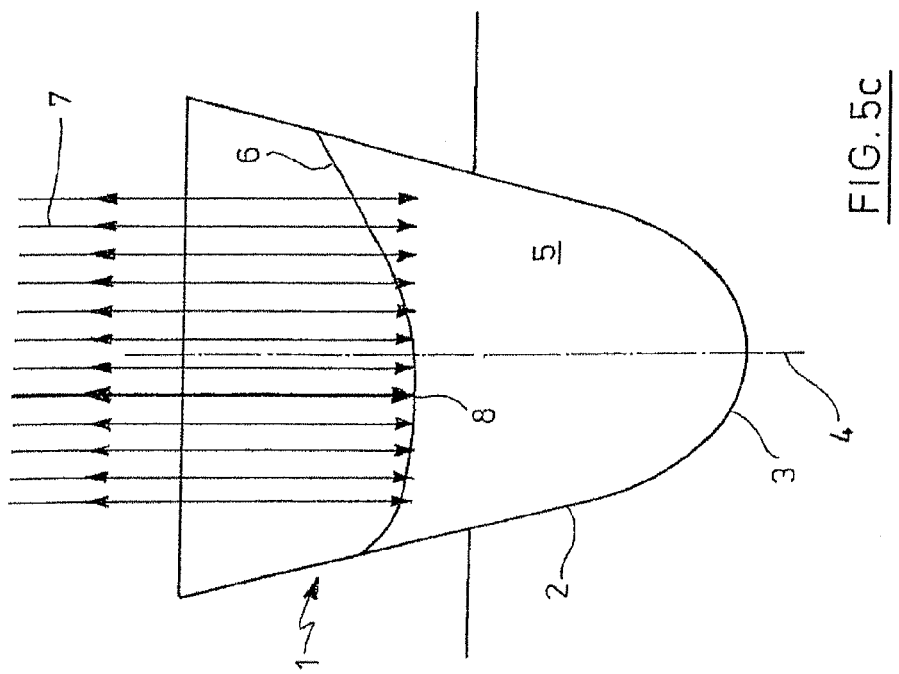

In accordance with one embodiment of the invention and FIGS. 5c and 6c, several parallel light beams 7 are directed at the boundary surface 6 in receptacle 1. In each case, one of the parallel light beams 7 hits the optimal reflection point 8. The reflected light is thus detectable using a photodetector (not shown), which is directed at the reflected light. The processes according to FIGS. 5a, 5b and 5c or respectively 6a, 6b and 6c are performed combined.

FIG. 7a shows the finding of the optimal reflection point 8 through spiral movement of the light beam 7 or respectively of the illumination area 12 over the boundary surface 6. When the illumination area 12 of the optimal reflection point 8 is at its closest, the photodetector delivers the strongest signal.

The illumination area has for example a diameter of approximately 0.3 mm and the paths of the illumination areas 12 have for example a separation distance of 0.2 mm in order to coat almost every point of the boundary surface. This also goes for displacements of the illumination area other than spiral displacements.

In accordance with FIG. 7b, the light beam 7 is moved gradually in different levels along the optical axis 4. In the uppermost level (relating to the drawn representation), it is moved in a spiral manner from the optical axis 4 up to a maximum distance from the optical axis 4. It is then moved parallel to the optical axis 4 into the next level down. There, it is displaced by a maximum distance from the optical axis 4 in spiral manner up to the optical axis 4. The illumination area 12 on the optical axis 4 is then moved to the next level down. There, it is moved outward again in a spiral manner up to a maximum distance from the optical axis 4 etc.

In accordance with FIG. 7c, the illumination area 12 illuminated by the light beam 7 executes an overlapping spiral movement around the optical axis 4 and downwards in the direction of the optical axis 4. The spiral movement starts from the optical axis 4 up to a maximum distance from the optical axis 4 and decreases from the maximum distance to the optical axis 4.

The scanning procedures in accordance with FIGS. 7b and 7c can be cancelled as soon as the greatest approximation of the illumination area 12 onto the optimal reflection point 8 is determined.

FIG. 7d shows the location of the optimal reflection point 8 using a matrix-like arrangement of light beams 7 on a real boundary surface 6 according to FIG. 4. The optimal reflection point 8 can generally be found in one single scanning operation. If applicable, a device for projecting the light beams 7 must be moved vertically (perpendicular to the drawing plane) in order to focus a light beam 7 on the optimal reflection point 8 on the boundary surface 6. The procedure in FIG. 7d is combined with the procedure in FIG. 7a.

Several light beams 7 for the scanning of the boundary surface 6 can be generated in different manners. A few examples of this are described below:

In accordance with FIG. 8, parallel light beams 7.1, 7.2, 7.3 from parallel light sources 9.1, 9.2, 9.3 are directed at a beam splitter 10. The light beams 7.1, 7.2, 7.3 are reflected onto a lens array by the beam splitter 10. The lens array 11 has a plurality of lenses arranged next to each other, wherein a lens is allocated to each light beam 7.1, 7.2, 7.3. The lens array 11 focuses the light beams 7.1, 7.2, 7.3 onto illumination areas 12.1, 12.2, 12.3 arranged in a grid-like manner.

In the example, all light beams 7.1, 7.2, 7.3 hit a reflecting boundary surface 6 perpendicularly so that the light is reflected in the direction of the incoming light beams 7.1, 7.2, 7.3. The reflected light is imaged by the lens array 11 and the beam splitter 10 onto parallel photodetectors 13.1, 13.2, 13.3.

The lens array 11 focuses the light beams 7.1, 7.2, 7.3 onto illumination areas 12.1, 12.2, 12.3 and the light reflected from the illumination areas onto photodetectors 13.1, 13.2, 13.3. When the illumination areas 12.1, 12.2, 12.3 are located on the boundary surface 6, the amount of light received by photodetectors 13.1, 13.2, 13.3 is at its maximum. The measurement signals of the photodetectors 13.1, 13.2, 13.3 thus show that the illumination areas 12.1, 12.2, 12.3 are located on the boundary surface 6. Thus, the distance from the boundary surface 6 to the optical sensor system is known.

In FIG. 8, the boundary surface 6 is even. In the case an uneven boundary surface 6, only a light beam 7.1 or 7.2 or 7.3 hitting an area of the boundary surface perpendicularly hits the optimal reflection point 8. The reflected light is received by photodetector 13.1 or 13.2 or 13.3, on which the concerned illumination area 12.1 or 12.2 or 12.3 is imaged. The measurement signal of this photodetector 13.1 or 13.2 or 13.3 indicates the location of the optimal reflection point 8 so that the distance from the boundary surface 6 to the optical sensor system can be determined on a non-plane boundary surface 6.

The optical sensor system from FIG. 9 only has one single light source 9. The light of this light source is divided into several virtual light sources 9.1, 9.2, 9.3 via a self-fanning light conductor 14.1, 14.2, 14.3. The light beams 7.1, 7.2, 7.3 emitted by it are in turn focused in the already described manner onto illumination areas 12.1, 12.2, 12.3 via an arrangement made up of beam splitter 10 and lens array 11. The light beams reflected from optimal illumination areas are imaged onto parallel photodetectors 13.1, 13.2, 13.3.

The optical sensor system from FIG. 10 differs from the one described previously in that it only has one photodetector 12. Unifying or respectively merging light conductors 15.1, 15.2, 15.3 are arranged prior to the photodetector 12. The fanned ends of the light conductors 15.1, 15.2, 15.3 are each allocated to one light beam 7.1, 7.2, 7.3. The light reflected out of illumination areas 12.1, 12.2, 12.3 in the direction of the incoming light beams 7.1, 7.2, 7.3 is imaged onto the inlets of the light conductors 15.1, 15.2, 15.3. The light coming in there is supplied to photodetector 13 in a bundled manner. The arrangement of an optimal reflection point 8 of the boundary surface 6 in at least one illumination area 12.1, 12.2, 12.3 is shown in an increased measurement signal of the photodetector 13.

The optical sensor system in accordance with FIG. 11 combines the several light sources 9.1, 9.2, 9.3 of the optical sensor system from FIG. 8 with unifying light conductors 15.1, 15.2, 15.3 and a downstream photodetector 13 from FIG. 10. The virtual light sources from FIG. 10 are thus replaced by actual light sources 9.1, 9.2, 9.3. If at least one illumination area 12.1, 12.2, 12.3 hits one optimal reflection point 8 of a boundary surface 6, it is shown in an increase in the measurement signal supplied by photodetector 13.

In the case of the arrangement in FIG. 12, a light source 9 supplies diverging light beams 7.1, 7.2, 7.3, which are reflected by beam splitter 10 and focused onto illumination areas 12.1, 12.2, 12.3 via a lens array 11. All illumination areas 12.1, 12.2, 12.3 hit an even boundary surface 6. The light beams 7.1, 7.2, 7.3 reflected from there are imaged onto photodetectors 13.1, 13.2, 13.3 by the lens array 11 and the beam distributor 10. If only one area of the boundary surface 6 is even, only the light beam 7.1 or 7.2 or 7.3 hitting that spot is reflected to the allocated photodetector 13.1 or 13.2 or 13.3. As a result, at the rise in the measurement signal of at least one photodetector 13.1, 13.2, 13.3, it is detectable that the boundary surface 6 is located in an illumination area 12.1, 12.2, 12.3.

The implementation in FIG. 13 differs from the one described above in that all photodetectors 13.1, 13.2, 13.3 are located on light beams 7.1, 7.2, 7.3, which are reflected parallel from the boundary surface 6. Since the light source 9 emits diverging light beams 7.1, 7.2, 7.3, they are only reflected by a boundary surface 6 with a plane central area 6.1 and two oppositely inclined edge areas 6.2, 6.3 onto the allocated photodetectors 13.1, 13.2, 13.3. The shape of the boundary surface 6 approximately matches the shape of a concave meniscus, which is formed multiple times by the surface of a liquid in a receptacle. The arrangement is thus particularly suitable for the detection of liquid levels in receptacles. Based on the rise in the sum of the measurement signals of the photodetectors 13.1, 13.2, 13.3, the arrangement of the illumination areas 12.1, 12.2, 12.3 on the boundary area 6.1, 6.2, 6.3 is especially well identifiable.

The optical sensor system in FIG. 14 has light sources 9.1, 9.2, 9.3, the light beams 7.1, 7.2, 7.3 of which converge so that they come together in a common illumination area 12 after reflection by a beam splitter 10 and bundling by a lens array 11. Photodetectors 13.1, 13.2, 13.3 are arranged on the light beams 7.1, 7.2, 7.3, which are reflected by a plane boundary surface 6, which is aligned perpendicular to the axis of the lens array 11. The arrangement of an optimal reflection point in the illumination area is shown by the rise in the measurement signals of all photodetectors 13.1, 13.2, 13.3. If only one of the incoming light beams 7.1 or 7.2 or 7.3 is reflected onto a photodetector 13.1 or 13.2 or 13.3, this is shown by a rise in the measurement signal of the concerned photodetector. Thus, this optical sensor system also facilitates the location of an optimal reflection point.

If the illumination areas 12.1, 12.2, 12.3 of the optical sensor systems described above do not hit an optimal reflection point 8 of a boundary surface 6, then it can be achieved through displacement of the optical sensor systems with respect to the boundary surface 6 that an illumination area hits an optimal reflection point 8 and thus the position of the boundary surface 6 can be determined.

In accordance with FIG. 15, an optical sensor system has a power supply 16 for several light sources 9, which have different wavelengths. The light sources 9 are controlled by a light control device 17. One of the different light sources 9 can specifically be switched on using the light control device 17, wherein the best wavelength for the detection of a certain boundary surface can be selected.

The measurement signal of a photodetector 13 is supplied to a noise filter 20 via an amplifier 18 with a gain control 19. The filtered measurement signal is supplied to an evaluation and control device in the form of a processing unit 21, which evaluates the measurement signals, after digitalization by means of an A/D converter (not shown). Depending on the measurement signals, the processing unit 21 controls an adjustment device 22 for the adjustment of the optical sensor system with respect to a boundary surface in the horizontal (X-Y) and vertical (Z) direction.

In accordance with FIG. 16, an optical sensor system according to the invention can determine the position of microplates 23 in the operating area 24 of a device for the treatment of liquids 25. A deviation, a parallel displacement or an otherwise faulty arrangement of a microplate 23 with respect to an intended position is detected with the help of the optical sensor system. It can be taken into consideration and corrected during the processing of liquids in the wells of the microplates 23 and/or during transport of microplates 23.

In accordance with FIG. 17, the position of microplates 23 and collection receptacles 26 in a rack 27 and the lack of a microplate at one intended position 28 is determined with the help of an optimal sensor system. The determined state of the lab products in the operating area 24 of the device for the treatment of liquids 25 is taken into consideration in the other treatment steps.

FIG. 18 shows an optical sensor system, in which only one light source 9 and only one photodetector 13 are switched on for the scanning of a barcode so that the measurement arrangement matches the exemplary embodiment according to EP 1 288 635 A2. The specifications concerning this matter in the aforementioned disclosure document are included in the present application through references. A barcode 29 on an object 30 is scanned by means of the measurement arrangement in order to identify it. In order to check the scanning, simultaneous measurement can be performed through activation of a second light source 9 (not shown) and a second photodetector (not shown). For this, the optical sensor system is moved in the horizontal direction with respect to the barcode 29.

The optical sensor system according to FIG. 19 generally matches the optical sensor system in FIG. 18. The projection and imaging device 11 is equipped with an adjustment device 31, which enables an adjustment of the axis of the projection of the light beam onto the illumination point and the imaging of the illumination point onto the detector 10 diagonal to the optical axis of the system. Furthermore, an additional adjustment device 32 is present for the adjusting of the optical sensor system in the direction of the optical axis 4, in order to perform a scan also in the direction perpendicular to the boundary surface. An evaluation and control device evaluates the signals of the detector 10 and controls the adjustment device 11 such that the punctiform illumination area 12 traverses a spiral path in order to scan a boundary surface. The optical sensor system is integrated into an automated device for the treatment of liquids 33.

In accordance with FIG. 20, the optical sensor system in FIG. 19 is performed for the scanning of a barcode in a horizontal surface of an object (e.g. a microtiter plate). For this, the illumination area can be displaced in the direction diagonal to the optical axis 4 by means of the adjustment device 31.

Finally, FIG. 21 shows one application, in which a barcode 29 is scanned on a perpendicular plane of an object (e.g. a microplate). There is a mirror for this, via which the light beam is reflected onto the barcode 29. The wandering of the light beam along the barcode 29 is controlled by adjusting the projection and imaging device 11 using the adjustment device 31.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An optical sensor system on a device for the treatment of liquids comprising:
at least one device for the projecting (9, 10, 11) of light in the direction of an optical axis (4) onto at least one illumination area (12) in a space,
an adjustment device (31) for adjusting the relative position of the at least one illumination area and a boundary surface in a direction diagonal to the optical axis,
an adjustment device (32) for adjusting the relative position of the at least one illumination area and the boundary surface in the direction of the optical axis,
a processing unit (21) for controlling the adjustment devices so that the optical axis corresponds with a basic arrangement of the projection axis at the beginning of a scanning operation and in the course of the scanning operation simultaneously adjust the relative position of the at least one illumination area and the boundary surface diagonal to the optical axis and in the direction of the optical axis,
at least one apparatus (11) for the imaging of the at least one illumination area during the adjustment of its relative position, the at least one apparatus including at least one photodetector (13), the at least one photodetector (13) providing at least one measurement signal, and
the processing unit (21) connected with the at least one photodetector (13) for evaluating the at least one measurement signal.

2. The optical sensor system according to claim 1, in which the adjustment device (31) for adjusting the relative position of the least one illumination area and the boundary surface diagonal to the optical axis is a device for pivoting a projection axis of the projecting device with respect to the optical axis and/or a device for the parallel displacement of the projection axis of the projecting device with respect to the optical axis.

3. The optical sensor system according to claim 2, in which the device for the pivoting (31) of the projection axis has a mirror that can be pivoted on two axes and/or asymmetric lenses and/or the device for the pivoting (31) of the projection axis has other beam deflection means in the beam path of the at least one projecting device.

4. The optical sensor system according to claim 2, in which the device for the parallel displacement (31) of the projection axis has planar glass that can be pivoted around two axes in the beam path of the at least one projecting device and/or a device for displacing the at least one projecting device along two different axes diagonal to the optical axis.

5. The optical sensor system according to claim 1, in which the processing unit (21) includes a control device for controlling the displacement of the at least one illumination area diagonal to the optical axis within a restricted area around the optical axis.

6. The optical sensor system according to claim 1, in which the processing unit (21) includes a control device for controlling the displacement of the at least one illumination area diagonal to the optical axis with the optical axis approximately in the center of the displacement.

7. The optical sensor system according to claim 1, in which the processing unit (21) includes a control device for controlling the displacement of the at least one illumination area diagonal to the optical axis along a path selected from the group consisting of a spiral path, a cycloid path, a circular path, a zigzag path, an accidental path, a chaotic path, a continuous path, and a broken path.

8. The optical sensor system according to claim 1, in which the processing unit (21) includes a control device for controlling the displacement of the at least one illumination area from the optical axis up to a maximum distance from the optical axis and/or the displacement of the at least one illumination area from a maximum distance from the optical axis to a reference axis.

9. The optical sensor system according to claim 8, in which the processing unit (21) includes a control device for controlling the displacement of the at least one illumination area repeatedly from the optical axis up until the reaching of a maximum distance from the optical axis and from the maximum distance to the optical axis.

10. The optical sensor system according to claim 1, in which the optical axis (4) is aligned vertically.

11. The optical sensor system according to claim 1, in which the processing unit (21) includes an evaluation device for determining a maximum measurement signal during displacement of the at least one illumination area diagonal to the optical axis and/or in the direction of the optical axis.

12. The optical sensor system according to claim 1, in which the processing unit (21) after determining a maximum measurement signal by the evaluation unit controls the displacement of the at least one illumination area approximately to the position or to a certain distance from the position in the direction of the optical axis, in which the maximum measurement signal was determined, and again controls the displacement of the at least one illumination area diagonal to the optical axis and/or in the direction of the optical axis, wherein the new displacement takes places around a shorter path and/or at a lower speed than the previous displacement.

13. The optical sensor system according to claim 1, in which the projecting device (9, 10, 11) is a device for the simultaneous projecting of light onto several illumination areas and/or the projecting device (9, 10, 11) is a device for the simultaneous projecting of light under different angles onto the same illumination area (12) and wherein the at least one photodetector comprises several photodetectors (13).

14. The optical sensor system according to claim 1, in which the projecting device (9, 10, 11) has at least one light source (9).

15. The optical sensor system according to claim 14, in which the least one light source (9) is at least a laser, LED or light bulb.

16. The optical sensor system according to claim 14, in which the at least one light source (9) emits light with a wavelength, which is reflected to a particularly strong degree by a boundary surface (6) to be detected.

17. The optical sensor system according to claim 14, in which the projecting device (9, 10, 11) has several separately switchable light sources (9) with different wavelengths or has a light source (9) with an adjustable wavelength.

18. The optical sensor system according to claim 1, in which the projecting device (9, 10, 11) is a device for projecting light onto at least one punctiform, linear or plane illumination area (12).

19. The optical sensor system according to claim 14, in which the at least one light source (9) is punctiform.

20. The optical sensor system according to claim 19, in which the project device (9, 10, 11) in the beam path of the at least one light source (9) has at least one aperture and/or at least one light conductor (14).

21. The optical sensor system according to claim 13, in which the illumination areas (12) have a three-dimensional arrangement or an arrangement in a surface.

22. The optical sensor system according to claim 21, in which the illumination areas (12) are arranged in one plane.

23. The optical sensor system according to claim 13, in which the illumination areas (12) are arranged in a convex or concave surface or in surfaces inclined towards each other.

24. The optical sensor system according to claim 1, in which the light beam (7) illuminating the at least one illumination area (12) has an aperture angle of 8° or less.

25. The optical sensor system according to claim 1, in which the distance between the at least one illumination area (12) and the projecting device (9, 10, 11) is 100 mm or more.

26. The optical sensor system according to claim 13, in which the projecting device (9, 10, 11) has a single light source (9) and at least one device for the imaging (11) of the light source onto at least one illumination area (12).

27. The optical sensor system according to claim 26, in which the projecting device (9, 10, 11) has a device for dividing (14) the light source into several virtual light sources and the at least one device for the imaging (11) images the several virtual light sources onto the at least one illumination area (12).

28. The optical sensor system according to claim 27, in which the device for dividing (14) the light source (9) comprises a self-fanning light conductor and/or a multi-hole aperture.

29. The optical sensor system according to claim 16, in which the projecting device (9, 10, 11) has several light sources (9) and the at least one device for imaging (11) images the several light sources onto the at least one illumination area (12).

30. The optical sensor system according to claim 13, in which the projecting device (9, 10, 11) has a common device for the imaging (11) of the several virtual light sources or the several light sources onto at least one illumination area (12).

31. The optical sensor system according to claim 1, in which the at least one photodetector (13) is punctiform, linear or plane.

32. The optical sensor system according to claim 31, in which at least one aperture and/or at least one light conductor (15) is arranged in the beam path between the at least one imaging device (11) and the at least one photodetector (13).

33. The optical sensor system according to claim 1 wherein the at least one photodetector is a single photodetector (13).

34. The optical sensor system according to claim 33, in which a device for merging (15) of light is arranged in the beam path between the at last one imaging device (11) and the photodetector (13).

35. The optical sensor system according to claim 34, in which the device for merging (15) of light has unifying light conductors.

36. The optical sensor system according to claim 13 wherein the at least one photodetector is several photodetectors (13).

37. The optical sensor system according to claim 1, in which the projecting device (9, 10, 11) and the at least one imaging device (11) are arranged coaxially.

38. The optical sensor system according to claim 1, in which the light is supplied via a beam splitter (10) of the imaging device (11) and the same imaging device (11) images the at least one illumination area (12) onto the at least one photodetector (13) via the beam splitter (10).

39. The optical sensor system according to claim 1, in which the the imaging apparatus (11) has a lens or several adjacent lenses or a lens array or a Fresnel lens.

40. The optical sensor system according to claim 1, in which the processing unit (21) has means for filtering (20) the measurement signal supplied by the at least one photodetector (13).

41. The optical sensor system according to claim 1, in which the relative position of the imaging apparatus and the boundary surface (6) and the at least one photodetector (13) can be adjusted using the adjustment devices.

42. The optical sensor system according to claim 1, in which the adjustment device (32) for adjusting in the direction of the optical axis has a zoom lens and/or an autofocus system in the imaging system.

43. The optical sensor system according to claim 1, in which the adjustment devices are motor-driven.

44. The optical sensor system according to claim 1, in which the processing unit (21) includes an evaluation device for determining the position and/or the identity and/or the shape of boundary surfaces and/or lab objects with them and/or the optimal reflection point on boundary surfaces.

45. The optical sensor system according to claim 1, in which the processing unit (21) includes an evaluation device for capturing an optically scannable marking on objects.

46. The optical sensor system according to claim 1 in combination with a device for the displacement of a dosing tool and/or in combination with a transport apparatus for the displacement of lab objects of the device for the treatment of liquids (33).

47. The optical sensor system according to claim 1 in combination with a holding device above a device for the displacement of lab objects of the device for the treatment of liquids (33).

48. The optical sensor system according to claim 1 on an automated device for the treatment of liquids (33).

49. A method for the scanning of boundary surfaces of liquids in lab receptacles and of lab objects, in which
    light is projected in the direction of an optical axis onto at least one illumination area in a space,
    the relative position of the at least one illumination area and the boundary surface is changed in a direction diagonal to the optical axis and simultaneously in the direction of the optical axis so that the optical axis corresponds with a projection axis at the beginning of a scan and during the scan simultaneously adjusts the relative position of the at least one illumination area and the boundary surface diagonal to the optical axis and in the direction of the optical axis,
    the at least one illumination area is imaged onto at least one photodetector, the at least one photodetector producing at least one measurement signal and
    the at least one measurement signal of the at least one photodetector is evaluated.

50. The method according to claim 49, in which the axis of the projection of the light onto at least one illumination area is pivoted with respect to a reference axis and/or parallel with respect to the optical axis.

51. The method according to claim 49, in which the at least one illumination area is displaced diagonal to the optical axis along a path selected from the group consisting of a spiral path, a cycloid path, a circular path, a zigzag path, an accidental path, a chaotic path, a continuous path, and a broken path.

52. The method according to claim 49, in which the at least one illumination area is displaced within specified limits around the optical axis.

53. The method according to claim 49, in which the at least one illumination area is changed further and further from the optical axis to a maximum distance from the optical axis and/or the least one illumination area is changed from a maximum distance from the optical axis closer and closer to the optical axis.

54. The method according to claim 53, in which the at least one illumination area is displaced repeatedly from the optical axis up to a maximum distance from the optical axis and from the maximum distance to the optical axis is reached.

55. The method according to claim 5, in which a maximum measurement signal is determined during the displacement of the at least one illumination area diagonal to the optical axis and/or along the optical axis.

56. The method according to claim 49, in which after determination of a maximum measurement signal the at least one illumination area is set to a close distance from the position along the optical axis in which the maximum measurement signal is determined, and the maximum measurement signal of the at least one photodetector is determined again during the displacement of the at least one illumination area diagonal to the optical axis and/or along the optical axis, wherein the at least one illumination area is displaced by a short path and/or with a slower speed than in the case of the previous displacement.

57. The method according to claim 49, in which the position of the illumination area is determined at a maximum of the measurement signal as the position of the boundary surface and/or as a position of the optimal reflection point on the boundary surface.

58. The method according to claim 49, in which light is simultaneously projected onto several illumination areas and/or light is projected under different angles onto the same illumination area and the at least one illumination area is imaged onto several photo detectors.

59. The method according to claim 58, in which the position of the at least one illumination area is changed in the diagonal direction with respect to the optical axis if no maximum of the measurement signal of at least one photodetector is determined during the changing of the distance between the illumination area and the boundary surface and then a maximum of the measurement signal is again sought while changing the distance of the at least one illumination area and the boundary surface.

60. The method according to claim 49, in which
    light is projected in the direction of a boundary surface onto at least one illumination area,
    a distribution of the reflected light quantity is determined by means of several photodetectors and
    a probable position of the optimal reflection point on the boundary surface and/or the probable position and/or the probable identity of the boundary surface is determined based on the determined light quantity distribution.

61. The method according to claim 60, in which the at least one illumination area is set to the probable position of the optimal reflection point and/or the probable position of the boundary surface and the measurement is repeated.

62. The method according to claim 49, in which
    light is projected onto several illumination areas,
    the illumination areas move over the boundary surface,
    each boundary surface is imaged onto a photodetector assigned to it and
    the measurement signals provided by the several photodetectors are compared and a measurement error is determined in the case of a deviation.

63. The method according to claim 49, in which a determined positions and/or identities of boundary surfaces and/or objects are saved and/or used to control and/or to check a method for the treatment of liquids.

64. The method according to claim 49, in which the positions of boundary surfaces are determined at the beginning of a method for the treatment of liquids and are determined again during the progression of a method for the treatment of liquids.

65. The method according to claim 64, in which the calculated values are checked by a new determination.

66. The method according to claim 24, in which the determined and/or calculated positions and/or identities are archived and/or output.

* * * * *

UNITED STATES PATENT AND TRADEMARK OFFICE
CERTIFICATE OF CORRECTION

PATENT NO. : 8,507,886 B2  
APPLICATION NO. : 12/676637  
DATED : August 13, 2013  
INVENTOR(S) : Reinhold Gotz et al.

Page 1 of 1

It is certified that error appears in the above-identified patent and that said Letters Patent is hereby corrected as shown below:

In the claims

Claim 27, Column 24, Line 2, delete "the" after for.

Claim 56, Column 25, Line 56, delete "5" and insert --49--.

Claim 58, Column 26, Line 18, delete "photo detectors" and insert --photodetectors--.

Claim 66, Column 26, Line 59, delete "24" and insert --64--.

Signed and Sealed this  
First Day of October, 2013

Teresa Stanek Rea  
*Deputy Director of the United States Patent and Trademark Office*